(12) United States Patent
Blackburne et al.

(10) Patent No.: US 12,211,121 B2
(45) Date of Patent: Jan. 28, 2025

(54) GENERATING SHARED AUGMENTED REALITY SCENES UTILIZING VIDEO TEXTURES FROM VIDEO STREAMS OF VIDEO CALL PARTICIPANTS

(71) Applicant: Meta Platforms, Inc., Menlo Park, CA (US)

(72) Inventors: Benjamin Patrick Blackburne, Baldock (GB); Michael Slater, Nottingham (GB); Hannes Luc Herman Verlinde, Ruislip (GB); Andrew James Senior, Redcar (GB)

(73) Assignee: Meta Platforms, Inc., Menlo Park, CA (US)

( * ) Notice: Subject to any disclaimer, the term of this patent is extended or adjusted under 35 U.S.C. 154(b) by 172 days.

(21) Appl. No.: 17/662,197

(22) Filed: May 5, 2022

(65) Prior Publication Data
US 2023/0360282 A1 Nov. 9, 2023

(51) Int. Cl.
*G06T 11/00* (2006.01)
*H04N 7/14* (2006.01)

(52) U.S. Cl.
CPC ........... *G06T 11/001* (2013.01); *H04N 7/141* (2013.01)

(58) Field of Classification Search
CPC ....... G06T 11/001; G06T 11/00; H04N 7/141; H04N 7/157; H04N 7/14
See application file for complete search history.

(56) References Cited

U.S. PATENT DOCUMENTS

| 8,402,094 | B2 | 3/2013 | Bosworth et al. |
| 9,654,591 | B2 | 5/2017 | Matus |
| 10,304,066 | B2 | 5/2019 | Tseng et al. |
| 2012/0166532 | A1 | 6/2012 | Juan et al. |
| 2021/0099433 | A1* | 4/2021 | Soryal ................ H04N 21/8166 |

FOREIGN PATENT DOCUMENTS

WO    WO 2022/056132    *   9/2020

* cited by examiner

*Primary Examiner* — Yosef K Laekemariam
(74) *Attorney, Agent, or Firm* — McDermott Will & Emery LLP

(57) ABSTRACT

Systems, methods, client devices, and non-transitory computer-readable media are disclosed for utilizing video data and video processing data to enable shared augmented reality scenes having video textures depicting participants of video calls as augmented reality (AR) effects during the video calls. For instance, the disclosed systems can establish a video call between client devices that include streaming channels (e.g., a video and audio data channel). In one or more implementations, the disclosed systems enable the client devices to transmit video processing data and video data of a participant through the streaming channel during a video call. Indeed, in one or more embodiments, the disclosed systems cause the client devices to utilize video data streams and video processing data to render videos as video textures within AR effects in a shared AR scene (or AR space) of the video call (e.g., to depict participants within the AR scene).

19 Claims, 14 Drawing Sheets

GENERATING SHARED AUGMENTED REALITY SCENES UTILIZING VIDEO TEXTURES FROM VIDEO STREAMS OF VIDEO CALL PARTICIPANTS

BACKGROUND

The present disclosure generally relates to video calling systems. Video calling systems allow users to electronically communicate via computing devices (e.g., smart phones, laptops, tablets, desktop computers) through the use of audio and video inputs (e.g., a built-in digital camera, digital web camera). Indeed, recent years have seen an increase in electronic communications through video calls and video conferences that enable multiple users to communicate via computing devices to share both video and audio of the users to one another. However, conventional video calling systems are often limited to non-interactive video calls that simply and rigidly enable user devices to present and view captured videos between the user devices.

SUMMARY

Embodiments of the present disclosure provide benefits and/or solve one or more of the foregoing or other problems in the art with systems, non-transitory computer-readable media, and methods that utilize video data and video processing data to enable shared augmented reality scenes having video textures depicting participants of video calls as augmented reality (AR) effects during the video calls. For instance, the disclosed systems can establish a video call between client devices that include streaming channels (e.g., a video and audio data channel). In one or more implementations, the disclosed systems enable the client devices to transmit video processing data (e.g., face tracking data, segmentation data, mask data, participant metadata) and video data of a participant through the streaming channels during a video call. Indeed, in one or more embodiments, the disclosed systems cause the client devices to utilize video data streams and video processing data from another participant device to render participant videos as video textures within AR effects in a shared AR scene (or AR space) of the video call.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
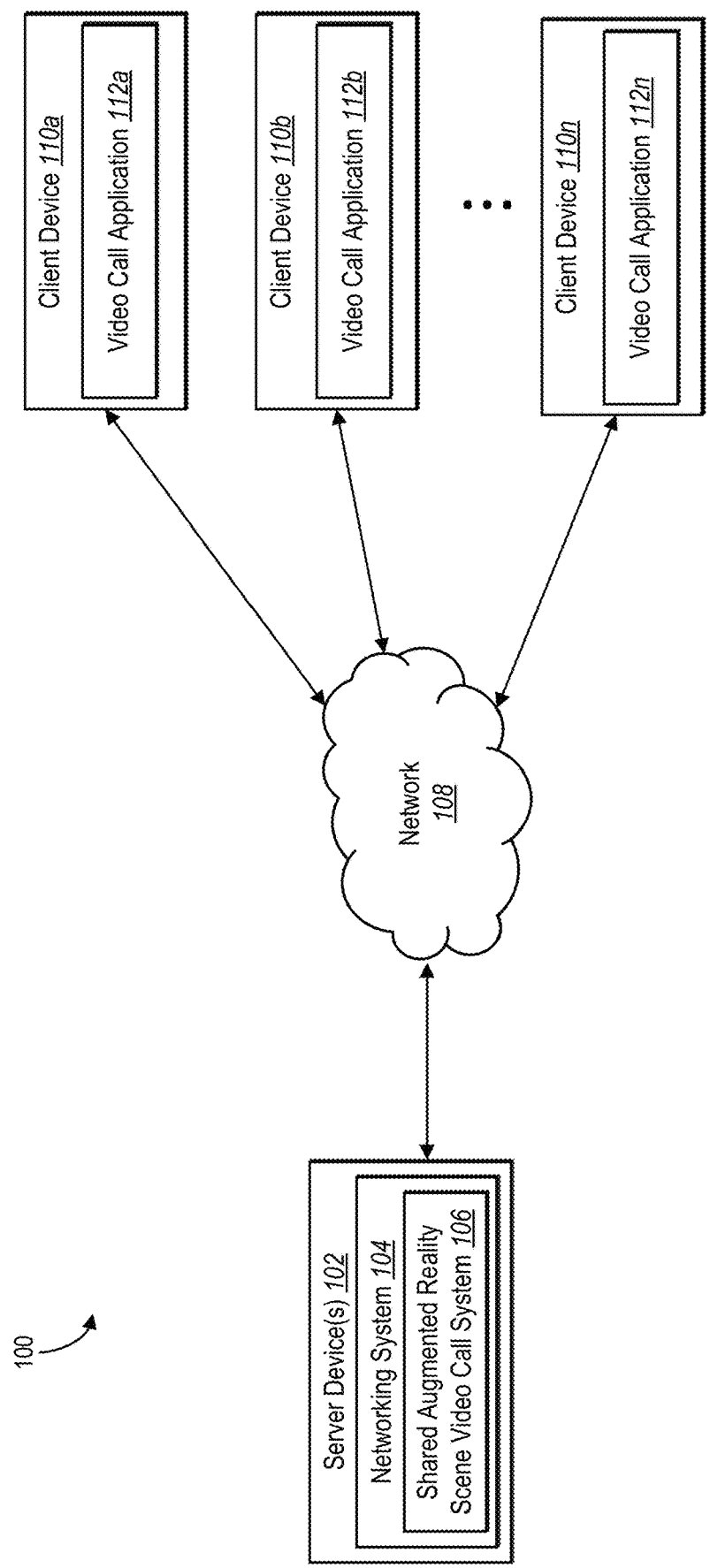
FIG. 1 illustrates an example environment in which a shared AR scene video call system can operate in accordance with one or more implementations.

This disclosure describes one or more embodiments of a shared augmented reality (AR) scene video call system that establishes a video call streaming to enable shared augmented reality scenes (or spaces) imposed with video textures depicting participants of video calls as augmented reality (AR) effects during the video calls. For example, in one or more embodiments, the shared AR scene video call system establishes a video call streaming channel for a video call between client devices. Indeed, in one or more implementations, the shared AR scene video call system enables client devices that are conducting a video call to transmit (or share) video data and video processing data through the video call streaming channel to facilitate a client device to (locally) render video textures for participants of the video call within an AR scene in the video call. To illustrate, the shared AR scene video call system enables a client device to utilize the video data and the corresponding video processing data to render videos of the participants as video textures within AR effects of an AR scene displayed within a video call interface on the client device.

To illustrate, in one or more embodiments, the shared AR scene video call system enables a client device to initiate an AR scene (or space) during a video call. Furthermore, upon initiating the AR scene during the video call, the shared AR scene video call system enables client devices participating in the video call to render an AR scene within a video call interface that portrays a three-dimensional (or two-dimensional) graphical scene instead of presenting only captured videos between the client devices. In addition, the shared AR scene video call system enables the client devices to receive video processing data (with video data) from other participant client devices and to utilize the video processing data to render videos of participants as video textures within AR effects in the AR scene. Indeed, the shared AR scene video call system can cause the client device to present a video call as an AR scene in which the participants of the video call are portrayed to be within the AR scene (as the video textures) instead of simply presenting captured videos between the client devices.

In one or more implementations, a client device can capture video during a video call and also capture video processing data to track one or more faces portrayed in the captured video, identify backgrounds (e.g., segmentation data), generate masks, and/or other data from the video (e.g., color data, depth information) using the raw captured video (and onboard sensors of the client device). Moreover, the shared AR scene video call system can enable the client device to transmit this video processing data to other client devices participating in the video call. In some cases, the video processing data can include data that is specific to individual participants depicted within a raw video feed on the client device.

In some cases, the shared AR scene video call system can enable a client device to transmit video processing data with video data through a streaming channel by combining the video processing data with the video data for transmission in a video data channel. For example, in certain implementations, the shared AR scene video call system enables a client device to transmit a video stream with a split video frame that includes both the video data (e.g., a video frame) and the video processing data. To illustrate, in some embodiments, the shared AR scene video call system enables the client device to generate a split video frame that includes a raw (or reduced resolution) video frame in a first portion of the split video frame and corresponding video processing data (e.g., a mask or other data indicating the position of a face in the video frame) in a second portion of the split video frame. Indeed, the shared AR scene video call system can enable the client device to simultaneously transmit video data and video processing data to another client device. Moreover, the shared AR scene video call system can enable the other client device to present a video call as an AR scene in which the participants of the video call are portrayed to be within the AR scene (as the video textures) utilizing the combined video data and video processing data.

In one or more implementations, the shared AR scene video call system establishes (or utilizes) a video data processing channel for a video call that enables client devices to transmit (and receive) video processing data in addition to video and audio data during the video call. For example, as part of the video call streaming channel, the shared AR scene video call system can establish a video data channel, an audio data channel, and/or a video processing data channel. Moreover, the shared AR scene video call system can enable a client device to transmit video data through a video data channel while also transmitting video processing data through a (separate) video processing data channel.

Furthermore, the shared AR scene video call system can enable another client device to receive the video data (e.g., as part of a split video frame via a video data channel or as a dedicated video feed via the video data channel) and video processing data (e.g., as part of a split video frame via a video data channel or separately via a video processing data channel) during the video call. Moreover, upon receiving the video processing data, the shared AR scene video call system can enable the client device to (locally) render videos of individual participants as video textures within AR effects utilizing the video data and video processing data of participant client devices. In one or more implementations, the shared AR scene video call system enables the client devices to render video textures per participant such that multiple participants captured on the same client device are rendered as separate video textures within the AR scene of the video call.

Indeed, in one or more embodiments, the shared AR scene video call system enables the client device to render an AR scene in which the incoming videos depicting participants of the video call are presented as video textures that are imposed in the AR scene as AR effects. Accordingly, the shared AR scene video call system can enable each client device (of the video call) to locally render video textures for individual participants (of the video call) in an AR scene to present an AR scene environment that includes one or more of the individual participants as an AR effect within the shared AR scene environment. Indeed, in one or more embodiments, the shared AR scene video call system enables client devices to render, within a video call interface, shared AR scenes in which participants of the video call are imposed within the environment scene within moving or movable graphical user interface elements. In addition, the shared AR scenes can include graphical environments in which participants of the video call are placed in different positions within the scene.

As mentioned above, the shared AR scene video call system provides technical advantages and benefits over conventional systems. For example, the shared AR scene video call system can establish and enable dynamic and flexible video calls between a plurality of participant devices that include participants as AR effects within a shared AR scene environment. In particular, unlike conventional video calling systems that are limited to rendering AR effects on a captured participant and streaming the captured video with the portrayal of the participant with the AR effect to other client devices, the shared AR scene video call system enables participants to initiate an AR scene and render video textures depicting participants of the video call within AR effects in the AR scene.

To illustrate, by utilizing either a split video frame or a dedicated video processing data channel between the plurality of participant devices during a video call, the shared AR scene video call system enables the participant devices to locally process and render videos of the participants as video textures imposed within a shared AR scene. This facilitates a wide variety of AR effects that impose participants of a video call within an AR scene or environment rather than simply presenting captured videos between the user devices.

In addition to improving the functionality of conventional video calls by rendering participants as video textures within an AR scene, the shared AR scene video call system also accurately (locally) renders the participants captured on other client devices as video textures in the AR scene (e.g., without having access to raw video data and raw video processing data tracking from those client devices). In particular, by establishing a dedicated video processing data channel to transmit video processing data for video streams across client devices during a video call, the shared AR scene video call system enables client devices to accurately identify areas of interest (e.g., face, hair, eyes) for participants from videos captured on other client devices. In turn, the shared AR scene video call system enables client devices to render video textures that accurately impose the areas of interest with AR effects.

Furthermore, the shared AR scene video call system also efficiently enables client devices to locally render participants captured on other client devices as video textures in an AR scene. In particular, the shared AR scene video call system enables each individual client device to analyze raw captured videos to generate video processing data for participants depicted in the raw captured videos. The shared AR scene video call system enables the sharing of the video processing data to other participant devices during a video call via the video processing data channel (or a split video frame that combines the video processing data with the video data). Indeed, the shared AR scene video call system enables the client devices participating in a video call to establish video tracking of multiple participants on the video call without having each client device process raw video for such information for each of the multiple participants. Accordingly, the shared AR scene video call system enables client devices to locally render participants captured on other client devices as video textures in an AR scene by leveraging video processing data from raw video data of each depicted participant while utilizing computational resources efficiently by having each participant device only analyze locally captured raw video data.

As illustrated by the foregoing discussion, the present disclosure utilizes a variety of terms to describe features and benefits of the shared AR scene video call system. Additional detail is now provided regarding the meaning of these terms. For instance, as used herein, the term "video call" refers to an electronic communication in which video data is transmitted between a plurality of computing devices. In particular, in one or more embodiments, a video call includes an electronic communication between computing devices that transmits and presents videos (and audio) captured on the computing devices.

As used herein, the term "channel" refers to a medium or stream utilized to transfer data (e.g., data packets) between client devices and/or a network. In one or more embodiments, the term "streaming channel" (sometimes referred to as "video call streaming channel") refers to a medium or stream (or a collection of streams) utilized to transfer data between client devices to establish a video call. In certain implementations, a streaming channel includes various combinations of a video data channel, an audio data channel, a video processing data channel, and/or an AR data channel.

In some cases, the term "video data channel" can refer to a medium or stream utilized to transfer video data between client devices and/or a network. Indeed, the video data channel can enable the transfer of a continuous stream of video data between client devices to display a video (e.g., a collection of moving image frames). In some cases, a video data channel can also include audio data for the captured video. In addition, the term "audio data channel" can refer to a medium or stream utilized to transfer audio data between client devices and/or a network that enables the transfer of a continuous stream of audio between client devices to play audio content (e.g., a captured recording from a microphone of a client device).

As mentioned above, in one or more embodiments, the shared AR scene video call system can enable a client device to transmit a split video frame through a video data channel. As used herein, the term "split video frame" refers to a video frame of a video that includes video data and video processing data. For example, the term "split video frame" can refer to a modified video frame that displays (or includes) an image or frame (from the video) in a first portion and video processing data for the image (from the video) in a second portion. For example, a split video frame can include a frame from a video as a first half of the split video frame and a segmentation mask for the image on a second half of the split video frame.

Furthermore, as used herein, the term "video processing data channel" refers to a medium or stream utilized to transfer video processing data between client devices and/or a network (for a video call). For instance, the term "video processing data channel" can enable the transfer of a continuous stream (and/or a situational transmission and/or request) of video processing data between client devices to communicate data from an analysis of (raw) videos captured at the individual client device level. In some implementations, the shared AR scene video call system utilizes data-interchange formats such as JavaScript Object Notation (JSON), real time protocol (RTP), and/or extensible markup language (XML) to write, transmit, receive, and/or read video processing data from the video processing data channel.

As also used herein, the term "video processing data" refers to data representing properties of a video. In particular, the term "video processing data" can refer to data representing properties or characteristics of one or more objects depicted within a video. For example, video processing data can include face tracking (or face recognition) data that indicates features and/or attributes of one or more faces depicted within a video (e.g., vectors and/or points that represent a structure of a depicted face, bounding box data to localize a depicted face, pixel coordinates of a depicted face). In addition, video processing data can include segmentation data that indicates salient objects, background pixels and/or foreground pixels, and/or mask data that utilize binary (or intensity values) per pixel to represent various layers of video frames (e.g., to distinguish or focus on objects depicted in a frame, such as hair, persons, faces, and/or eyes).

In addition, video processing data can include alpha channel data that indicates degrees of transparency for various color channels represented within video frames. Furthermore, video processing data can include participant metadata that can classify individual participants, label individual participants (e.g., using participant identifiers), participant names, statuses of participants, and/or number of participants. The video processing data can also include metadata for the video stream (e.g., a video resolution, a video format, camera focal length, camera aperture size, camera sensor size). Indeed, the shared AR scene video call system can enable client devices to transmit video processing data that indicates various aspects and/or characteristics of a video or objects depicted within a video.

As used herein, the term "video texture" refers to a graphical surface that is applied to a computer graphics object to superimpose the computer graphics object with a video. In one or more embodiments, the term "video texture" refers to a computer graphics surface generated from a video that overlays or superimposes (i.e., maps) a video onto a graphics-based object (a three-dimensional object or scene, a still image, or a two-dimensional animation or scene). In some embodiments, the shared AR scene video call system enables a client device to render a video as a video texture within an AR effect such that the video texture depicts a captured video of a participant superimposed onto an AR effect within an AR scene (or environment).

Moreover, as used herein, the term "augmented reality effect" refers to one or more AR elements that present (or display) an interactive, manipulatable, and/or spatially aware graphical animation or AR element. In particular, the term "augmented reality effect" can include a graphical animation that realistically interacts with a person (or user) or with a scene (or environment) captured within a video such that the graphical animation appears to realistically exist within the environment (e.g., a graphic-based environment or an environment captured in a video). As an example, an augmented reality effect can include graphical characters, objects (e.g., vehicles, plants, buildings), and/or modifications to persons captured within the video call (e.g., wearing a mask, change to appearance of a participating user on a video call, change to clothing, an addition of graphical accessories, a face swap).

In some cases, an AR element can include visual content (two dimensional and/or three dimensional) that is displayed (or imposed) by a computing device (e.g., a smartphone or head mounted display) on a video (e.g., a live video feed) of the real world (e.g., a video capturing real world environments and/or users on a video call). In particular, an AR element can include a graphical object, digital image, digital video, text, and/or graphical user interface displayed on (or within) a computing device that is also rendering a video or other digital media. For example, an AR element can include a graphical object (e.g., a three dimensional and/or two-dimensional object) that is interactive, manipulatable, and/or configured to realistically interact (e.g., based on user interactions, movements, lighting, shadows) with a graphic-based environment or an environment (or person) captured in a video of a computing device. Indeed, in one or more embodiments, an AR element can modify a foreground and/or background of a video and/or modify a filter of a video.

Additionally, as used herein, the term "augmented reality scene" (sometimes referred to as an "AR environment") refers to one or more AR effects (e.g., AR elements) that are interactive, manipulatable, and/or configured to realistically interact with each other and/or user interactions detected on a computing device. In some embodiments, an augmented reality environment scene includes one or more augmented reality elements that modify and/or portray a graphical environment (a two-dimensional and/or a three-dimension environment) in place of a real-world environment captured in a video of a computing device. As an example, the shared AR scene video call system can render an augmented reality environment scene to portray one or more participants of a video call to be within a graphical environment as AR effects (e.g., the participants as AR-based characters in space, underwater, at a campfire, in a forest, at a beach) utilizing captured videos portraying the participants. In some cases, the shared AR scene video call system further enables augmented reality elements within the augmented reality environment scene to be interactive, manipulatable, and/or configured to realistically interact to user interactions detected on a plurality of participant devices.

Furthermore, as used herein, the term "self-view display" refers to a display of a video capture that is captured and displayed on the same client device. In particular, as used herein, the term "self-view display" can refer to a display of a camera capture buffer that displays, within a client device, a video captured on the client device. In one or more embodiments, the shared AR scene video call system enables a client device to display an AR environment scene (having video textures of multiple participants as AR effects) within a self-view display to create the perception that the AR environment scene with the multiple participants (from different client devices of a video call) are captured directly on the client device (e.g., a view similar to a video capture from a camera buffer). As used herein, the term "grid-view display" refers to a display having multiple partitions to separately display videos from different client devices participating in a video call.

Additional detail regarding the shared AR scene video call system will now be provided with reference to the figures. For example, FIG. 1 illustrates a schematic diagram of an exemplary system environment ("environment") 100 in which a shared augmented reality scene video call system 106 (also referred to as a "shared AR scene video call system 106") can be implemented. As illustrated in FIG. 1, the environment 100 includes a server device(s) 102, a network 108, and client devices 110a-110n.

Although the environment 100 of FIG. 1 is depicted as having a particular number of components, the environment 100 can have any number of additional or alternative components (e.g., any number of server devices and/or client devices in communication with the shared AR scene video call system 106 either directly or via the network 108). Similarly, although FIG. 1 illustrates a particular arrangement of the server device(s) 102, the network 108, the client devices 110a-110n, various additional arrangements are possible.

The server device(s) 102, the network 108, and the client devices 110a-110n may be communicatively coupled with each other either directly or indirectly (e.g., through the network 108 discussed in greater detail below in relation to FIGS. 12 and 13). Moreover, the server device(s) 102 and the client devices 110a-110n may include a variety of computing devices (including one or more computing devices as discussed in greater detail with relation to FIG. 11).

As mentioned above, the environment 100 includes the server device(s) 102. In one or more embodiments, the server device(s) 102 generates, stores, receives, and/or transmits digital data, including digital data related to video data and video processing data for video calls between client devices (e.g., client devices 110a-110n). In some embodiments, the server device(s) 102 comprises a data server. In one or more embodiments, the server device(s) 102 comprises a communication server or a web-hosting server.

As shown in FIG. 1, the server device(s) 102 includes a networking system 104. In particular, the networking system 104 can provide a digital platform (e.g., a social network, instant messenger, extended-reality environment) that includes functionality through which users of the networking system 104 can connect to and/or interact with one another. For example, the networking system 104 can register a user (e.g., a user of one of the client devices 110a-110n). The networking system 104 can further provide features through which the user can connect to and/or interact with co-users. For example, the networking system 104 can provide messaging features, chat features, and/or video call features through which a user can communicate with one or more co-users. The networking system 104 can also generate and provide groups and communities through which the user can associate with co-users.

In one or more embodiments, the networking system 104 comprises a social networking system, but in other embodiments the networking system 104 may comprise another type of system, including but not limited to an e-mail system, video calling system, search engine system, e-commerce system, banking system, metaverse system or any number of other system types that use user accounts. For example, in some implementations, the networking system 104 generates and/or obtains data for an extended-reality device (e.g., client devices 110a-110n via the server device(s) 102).

In one or more embodiments where the networking system 104 comprises a social networking system, the networking system 104 may include a social graph system for representing and analyzing a plurality of users and concepts. A node storage of the social graph system can store node information comprising nodes for users, nodes for concepts, and nodes for items. An edge storage of the social graph system can store edge information comprising relationships between nodes and/or actions occurring within the social networking system. Further detail regarding social networking systems, social graphs, edges, and nodes is presented below with respect to FIGS. 12 and 13.

As further shown in FIG. 1, the server device(s) 102 includes the shared AR scene video call system 106. In one or more embodiments, the shared AR scene video call system 106 establishes a video call streaming channel between client devices to enable a video call between the client devices and enable the client devices to render videos of participants as video textures within AR effects in a shared AR scene. Indeed, in one or more embodiments, the shared AR scene video call system 106 establishes a video call (between various numbers of client devices from the client devices 110a-110n) that enables client devices to present a video call interface displaying an AR scene with participants of the video call as AR elements in the AR scene. Furthermore, in one or more embodiments, the shared AR scene video call system 106 is implemented as part of a social networking system that facilitates electronic communications such as instant messaging, video calling, and/or social network posts (e.g., as discussed in greater detail with relation to FIGS. 12 and 13.

Moreover, in one or more embodiments, the environment 100 includes the client devices 110a-110n. For example, the client devices 110a-110n can include computing devices that are capable of interacting with the shared AR scene video call system 106 to conduct video calls (and/or) other electronic communications with one or more other client devices. Indeed, the client devices 110a-110n can capture videos from digital cameras of the client devices 110a-110n and further utilize video processing data corresponding to the videos (e.g., via a split video frame or a video processing data channel) to render videos of the video call participants as video textures within AR effects in an AR scene. In some implementations, the client devices 110a-110n include at least one of a smartphone, a tablet, a desktop computer, a laptop computer, a head mounted display device, or other electronic device.

Figure 12:
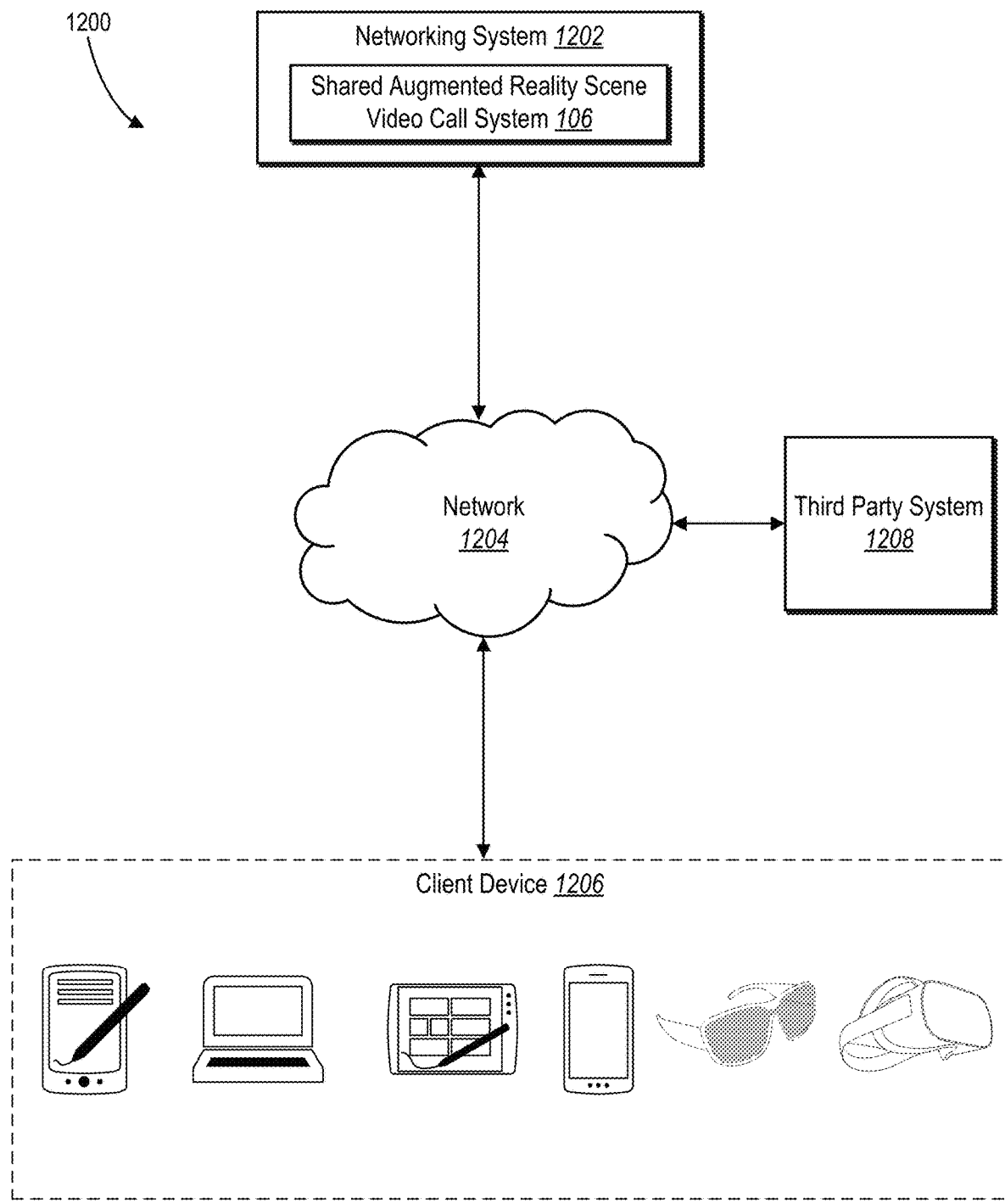
FIG. 12 illustrates an example environment of a networking system having a virtual reality system in accordance with one or more implementations.
Figure 13:
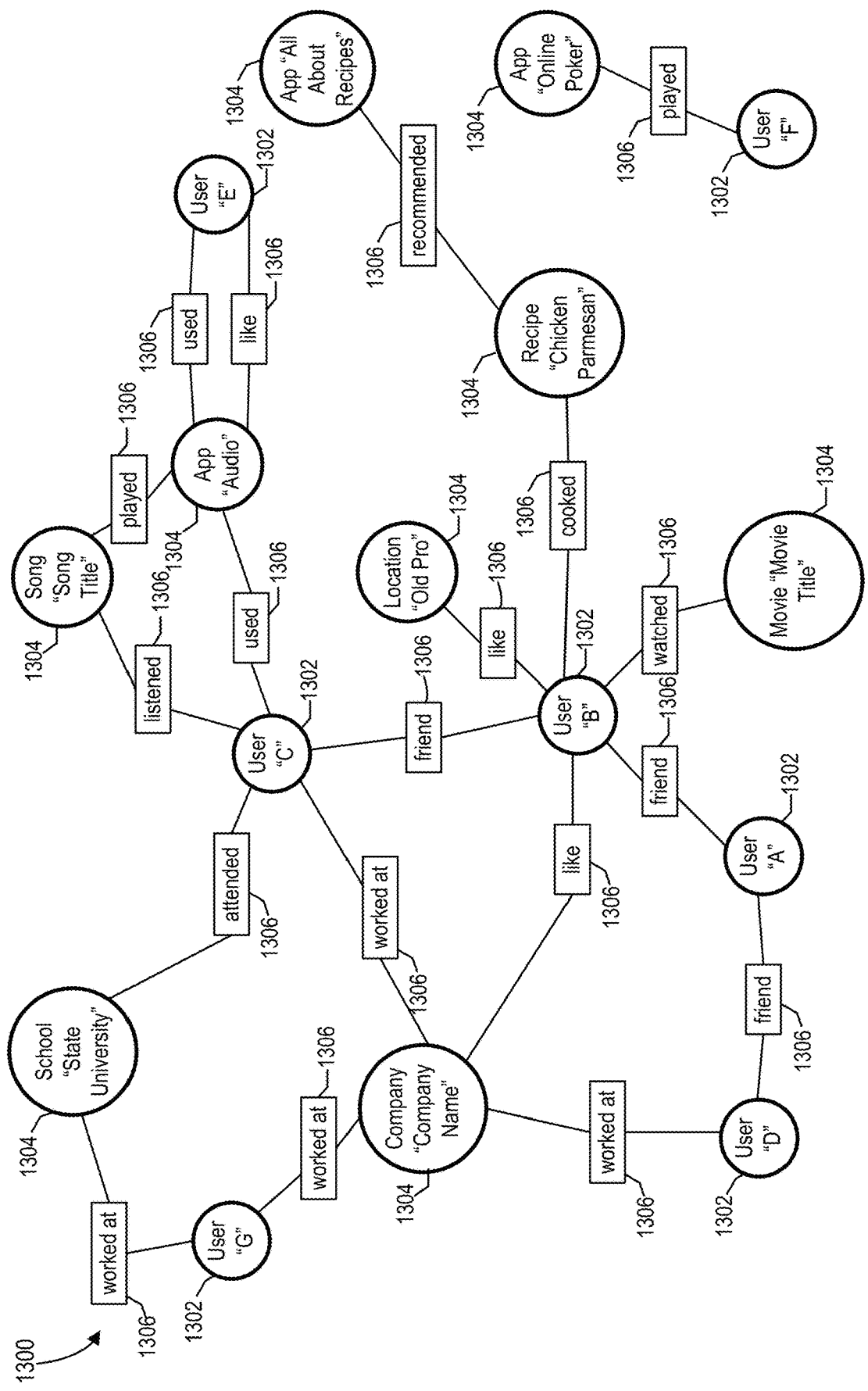
FIG. 13 illustrates an example social graph in accordance with one or more implementations.

Additionally, in some embodiments, each of the client devices 110a-110n is associated with one or more user accounts of a social network system (e.g., as described in relation to FIGS. 12 and 13. In one or more embodiments, the client devices 110a-110n include one or more applications (e.g., the video call applications 112a-112n) that are capable of interacting with the shared AR scene video call system 106, such as by initiating video calls, transmitting video data and/or video processing data, and/or receiving video data and/or video processing data). In addition, the video call applications 112a-112n are also capable of utilizing video call data and/or video processing data to render videos of participants (e.g., users operating the client devices) as video textures within AR effects. In some instances, the video call applications 112a-112n include software applications installed on the client devices 110a-110n. In other cases, however, the video call application 112a-112n includes a web browser or other application that accesses a software application hosted on the server device(s) 102.

The shared AR scene video call system 106 can be implemented in whole, or in part, by the individual elements of the environment 100. Indeed, although FIG. 1 illustrates the shared AR scene video call system 106 implemented with regard to the server device(s) 102, different components of the shared AR scene video call system 106 can be implemented by a variety of devices within the environment 100. For example, one or more (or all) components of the shared AR scene video call system 106 can be implemented by a different computing device (e.g., one of the client devices 110a-110n) or a separate server from the server device(s) 102.

Figure 2:
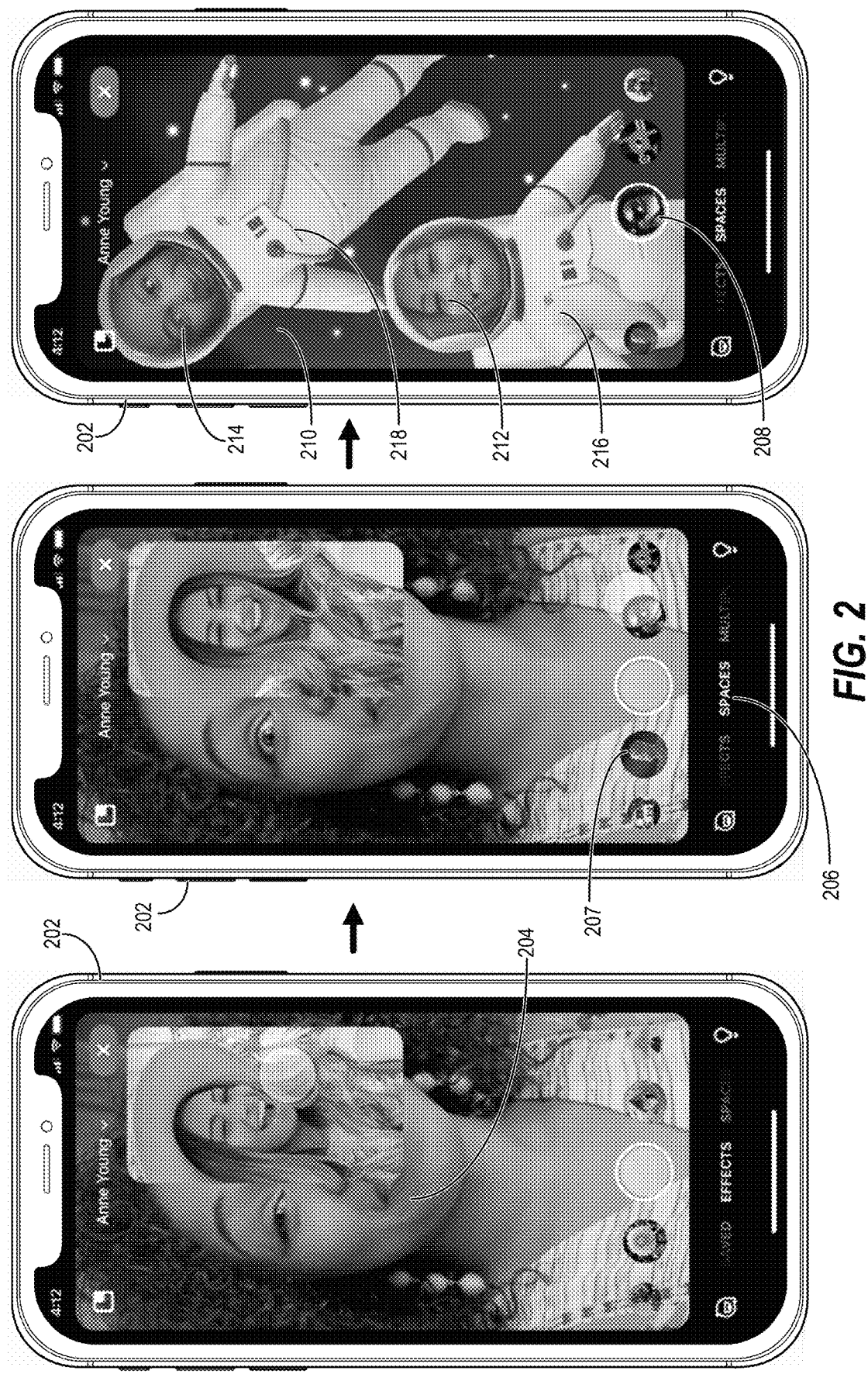
FIG. 2 illustrates an example of a shared AR scene video call system establishing and facilitating a shared AR scene video call in accordance with one or more implementations.

As mentioned above, the shared AR scene video call system 106 can enable client devices to render shared AR scenes (or spaces) imposed with video textures depicting participants of video calls as AR effects during the video calls. For example, FIG. 2 illustrates the shared AR scene video call system 106 enabling client devices participating in a video call to initiate a shared AR scene video call with participants of the video calls as AR effects within the shared AR scene. For instance, as shown in FIG. 2, the shared AR scene video call system 106 enables a client device 202 to display a video call interface 204 for a video call between participants (e.g., utilizing a grid-view display).

In addition, as shown in FIG. 2, the client device 202 displays a selectable option 206 to initiate a shared AR scene during the video call. Upon detecting a selection of the selectable option 206, as shown in FIG. 2, the client device 202 displays selectable AR scene options 207. As further shown in FIG. 2, the client device 202 receives a selection of a particular AR scene option 208 from the selectable AR scene options 207. Subsequently, as shown in FIG. 2, the client device 202 utilizes video data and video processing data (as described in one or more embodiments herein) to render videos of participants as video textures 212, 214 within AR effects 216, 218 in an AR scene environment 210 (e.g., utilizing a self-view display).

Figure 3:
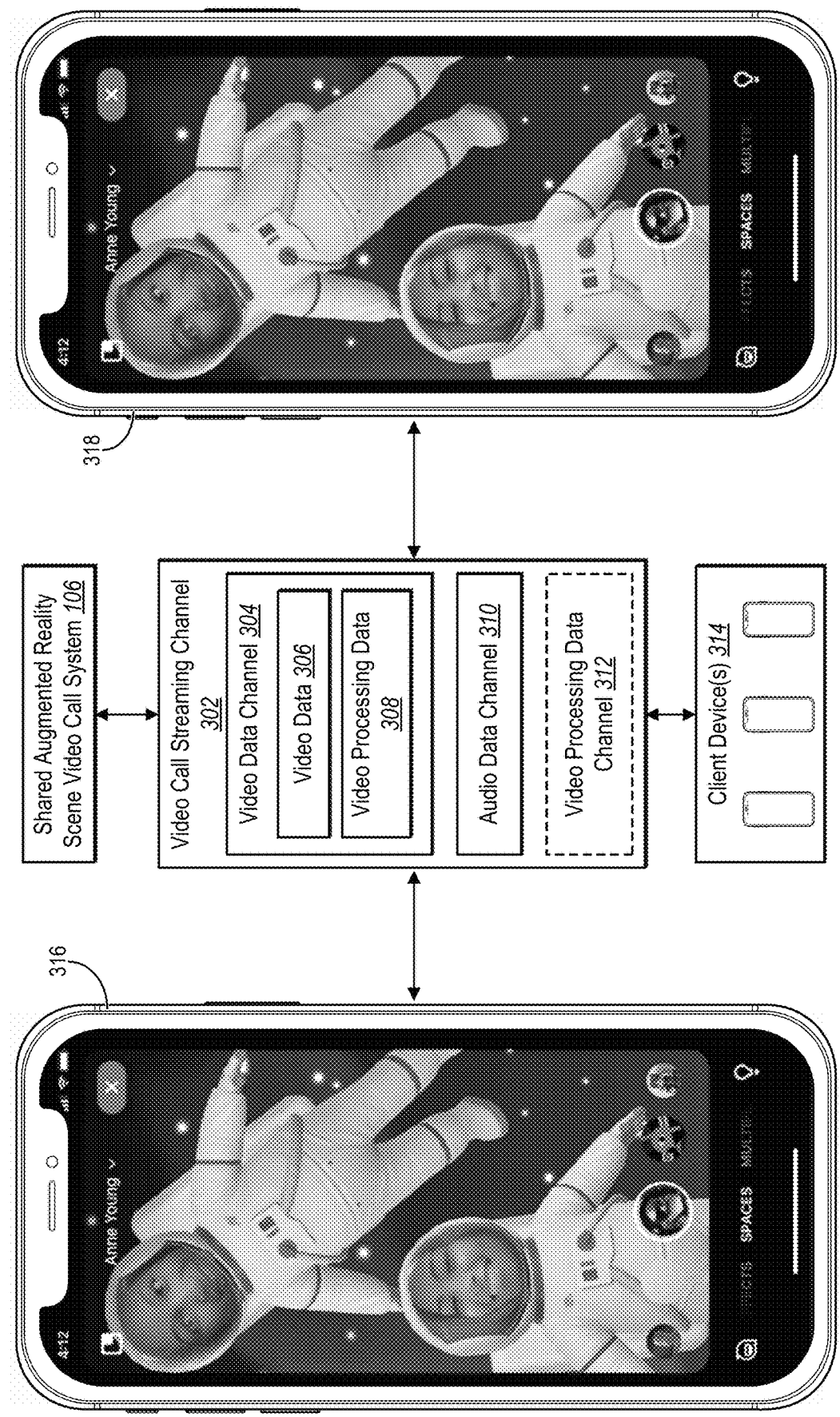
FIG. 3 illustrates an example of a shared AR scene video call system establishing and facilitating a shared AR scene video call between participant devices utilizing a video call streaming channel in accordance with one or more implementations.

As mentioned above, the shared AR scene video call system 106 can enable client devices participating in a video call to transmit video data and video processing data to render shared AR scenes during video calls with videos of participants as video textures within AR effects. For example, FIG. 3 illustrates the shared AR scene video call system 106 establishing a video call streaming channel to enable client devices to transmit (and share) video data and video processing data during a video call (e.g., facilitating a shared AR scene video call). Indeed, FIG. 3 illustrates the shared AR scene video call system 106 enabling client devices to transmit video data and video processing data through a video call streaming channel to enable the client devices to render shared AR scenes (or spaces) imposed with video textures depicting participants of video calls as AR effects during a video call.

As shown in FIG. 3, the shared AR scene video call system 106 establishes a video call streaming channel 302 that includes a video data channel 304 and an audio data channel 310. As illustrated in FIG. 3, the shared AR scene video call system 106 establishes a video call stream (video data 306) between a client device 316 and a client device 318. In particular, as shown in FIG. 3, the shared AR scene video call system 106 establishes the video call streaming channel 302 with a video data channel 304 to enable video communication between client device 316 and client device 318. As shown in FIG. 3, the client devices 316, 318 can transmit both video data 306 and video processing data 308 through the video data channel 304. In some instances, the client device 316 and the client device 318 also transmit audio data from an audio captured on the respective client devices through the audio data channel 310. In certain implementations, the video call streaming channel 302 can also include a video processing data channel 312 (e.g., to separately transmit and/or receive video processing data).

In reference to FIG. 3, the client device 316 and the client device 318 individually capture videos of participants using the client devices. In addition, the client devices 316, 318 can also identify (or generate) video processing data for the captured videos. Then, in some cases, the client devices 316, 318 transmit a combination of the video data 306 and video processing data 308 utilizing split video frames through the video call streaming channel 302 (e.g., through the video data channel 304) as described below (e.g., in relation to FIG. 6).

Moreover, the client devices 316, 318 receive the combination of the video data 306 and the video processing data 308 and utilize the data to render a shared AR scene during the video call. For example, as shown in FIG. 3, the client devices 316, 318 utilize video data depicting participants of the video call to render video textures within AR effects. Then, as shown in FIG. 3, the client devices 316, 318 provide for display, within a video call interface (e.g., as a self-view display), the video texture-based AR effects within an AR scene environment during the video call as described below (e.g., in relation to FIG. 5).

In some implementations, the client devices 316, 318 transmit video data via the video data channel 304 and video processing data via a separate video processing data channel. Indeed, in some embodiments, client devices can transmit video data within a video data channel (e.g., to transmit a raw and/or high-resolution video stream) while separately transmitting corresponding video processing data via a video processing data channel. For instance, a client device can receive the video data and the video processing data (via the separate video call streaming channels) and utilize the two sets of data to render videos of participants of the video call as video textures within AR effects.

To illustrate, in some embodiments, the shared AR scene video call system 106 establishes and utilizes a video processing data channel that facilitates a real time transfer of video processing data during a video call. For instance, during a video call, the shared AR scene video call system 106 can establish a video processing data channel that facilitates the transmission (and reception) of additional data (e.g., in addition to video and audio data) during a video call to share video processing data determined (or identified) from video directly on the capturing client device. For example, the shared AR scene video call system 106 can enable, via the video processing data channel, a client device to transmit video processing data, such as, but not limited to participant metadata, face tracking data, segmentation data, masking data from a captured video stream to other participant client devices on the video call.

In some embodiments, the shared AR scene video call system 106 establishes a video processing data channel to utilize one or more data-interchange formats to facilitate the transmission of video processing data within the video processing data channel. For instance, the shared AR scene video call system 106 can enable the video processing data channel to transmit video processing data in formats, such as, but not limited to JavaScript Object Notation (JSON), plain text, and/or Extensible Markup Language (XML). In addition, in one or more embodiments, the shared AR scene video call system 106 establishes the video processing data channel utilizing an end-to-end network protocol that facilitates the streaming of real time data to stream video processing data between a plurality of client devices. For example, the shared AR scene video call system 106 can enable the video processing data channel to transmit video processing data via end-to-end network protocols, such as, but not limited to Real-Time Transport Protocol (RTP), real time streaming protocol (RTSP), real data transport (RDT), and/or another data sync service.

In some embodiments, the shared AR scene video call system 106 enables client devices to utilize JSON formatted message broadcasting via the video processing data channel to communicate video processing data. For example, the shared AR scene video call system 106 can, during a video call, establish a data message channel capable of transmitting JSON formatted messages as the video processing data channel. Indeed, the shared AR scene video call system 106 can establish a data message channel that persist during one or more active AR scenes during the video call. In addition, the shared AR scene video call system 106 can establish the data message channel as a named, bidirectional communication data channel that facilitates requests to transmit video processing data and requests to receive video processing data. For instance, the shared AR scene video call system 106 can enable a data message channel capable of transmitting text-based or data-based translations of video processing data (e.g., face tracking coordinates, segmentation mask pixel values, pixel color values, participant metadata).

In some cases, the shared AR scene video call system 106 can utilize a JSON formatted message as a JSON object that includes one or more accessible values. In particular, the JSON object can include one or more variables and/or data references (e.g., via Booleans, strings, numbers) that can be accessed via a call to the particular variable. For example, the shared AR scene video call system 106 can facilitate the transmission and reception of JSON objects that are accessed to determine information of video processing data.

In one or more embodiments, the shared AR scene video call system 106 can utilize a video or image communication channel as a video processing data channel. For example, the shared AR scene video call system 106 can establish a data channel that facilitates the transmission of videos, video frames, and/or images as the video processing data channel. Moreover, the shared AR scene video call system 106 can transmit video processing data, such as, segmentation masks and/or face tracking masks as images and/or video frames via a video processing data channel.

In addition, the shared AR scene video call system 106 can establish a video processing data channel that utilizes a real-time synchronous data channel (e.g., a sync channel). In one or more embodiments, the shared AR scene video call system 106 establishes the video processing data channel to synchronize with a video data channel. In particular, the shared AR scene video call system 106 can enable the video processing data channel to transmit and/or receive video processing data in synchronization with video data transmitted and/or received via a video data channel. For example, the shared AR scene video call system 106 can enable a client device to transmit video processing data with a time stamp to match a time stamp of video data transmitted via a video data channel to synchronize the data.

In addition, the shared AR scene video call system 106 can establish a synchronized video processing data channel that transmits video processing data in message order to synchronize the video processing data across the plurality of client devices. In some cases, the shared AR scene video call system 106 can establish a video processing data channel utilizes an asynchronous data channel that broadcasts data to client devices regardless of synchronization between the client devices.

In one or more embodiments, the shared AR scene video call system 106 can enable client devices to render video textures from captured videos and transmit the video textures via a video processing data channel. For example, a client device can receive video textures (of participants) from participant client devices via the video processing data channel during a video call and utilize the video textures within AR effects. In one or more embodiments, the shared AR scene video call system 106 can enable a client device to utilize a machine learning model (e.g., a convolutional neural network, an adversarial generative neural network) to receive and process video textures from the participant client devices via the video processing data channel during a video call.

Moreover, the shared AR scene video call system 106 can provide an application programming interface (API) to one or more client devices to communicate video processing data with each other and the shared AR scene video call system 106 during a video call. To illustrate, the shared AR scene video call system 106 can provide an API that includes calls to communicate requests, transmissions, and/or notifications for video processing data across a video processing data channel established by the shared AR scene video call system 106. Indeed, client devices (and/or the shared AR scene video call system 106) can utilize an API to communicate video processing data during a video call to render AR scenes with participants depicted as AR effects in accordance with one or more embodiments herein.

In some cases, a client device includes a client device layer for the video call streams established by the shared AR scene video call system 106. In particular, a client device can utilize a client device layer (e.g., a layer within an API and/or a network protocol) that controls the transmission and/or reception of video processing data via the video processing data channel. For instance, a client device can utilize a client device layer to receive and filter video processing data that is broadcast (or transmitted) via the video processing data channel from one or more client devices participating in a video call. In particular, in one or more embodiments, client devices transmit video processing data via the video processing data channel to each client device participating on a (same) video call. Moreover, a client device can identify the transmitted video processing data utilizing a client device layer and filter the video processing data (e.g., to utilize or ignore the video processing data). For instance, a client device can utilize a client device layer to filter video processing data based on participant identifiers corresponding to the video processing data (as described below) to determine which participants to include within an AR scene video call.

In some implementations, the shared AR scene video call system 106 can enable a shared AR scene video call between a plurality of client devices. For example, as illustrated in FIG. 3, the shared AR scene video call system 106 can establish the video call streaming channel 302 (e.g., the video data channel 304, the audio data channel 310, and/or the video processing data channel 312) between the client device 316, the client device 318, and one or more of the client devices 314. Indeed, upon transmitting video processing data through the video call streaming channel 302, the client device 316, the client device 318, and the one or more of the client devices 314 can render videos of the participants as video textures within AR effects of an AR scene displayed within video call interfaces on the plurality of client devices (in accordance with one or more embodiments herein).

Figure 4:
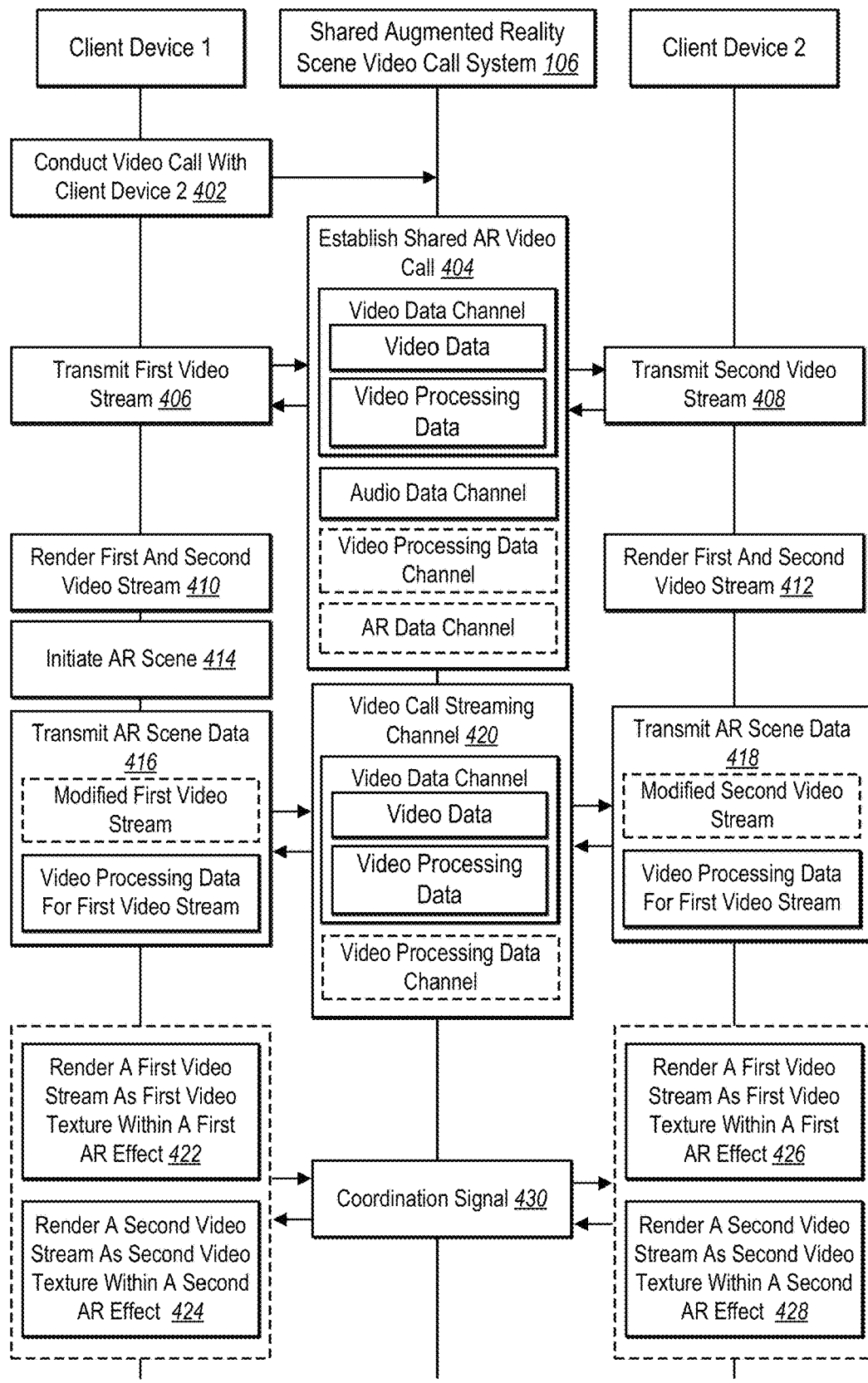
FIG. 4 illustrates a flow diagram of the shared AR scene video call system establishing a shared AR scene video call between client devices in accordance with one or more implementations.

As mentioned above, the shared AR scene video call system 106 can enable client devices to render videos of participants as video textures within AR effects in an AR scene during a video call. FIG. 4 illustrates a flow diagram of the shared AR scene video call system 106 establishing a shared AR scene video call between client devices. For example, as shown in FIG. 4, the shared AR scene video call system 106 can enable client devices to transmit video data and video processing data to render videos of participants as video textures within AR effects in an AR scene during a video call.

For example, as shown in FIG. 4, the shared AR scene video call system 106 receives, in an act 402, a request to conduct a video call with a client device 2 from a client device 1 (e.g., a request to initiate a video call). Then, as shown in act 404 of FIG. 4, the shared AR scene video call system 106 establishes a shared AR scene video call between the client device 1 and the client device 2 (e.g., which includes a video data channel, an audio data channel, a video processing data channel, and/or an AR data channel).

Subsequently, as shown in act 406 of FIG. 4, the client device 1 transmits a first video stream (e.g., a video stream captured on the client device 1) to the client device 2 through the video data channel and the audio data channel. As further shown in act 408 of FIG. 4, the client device 2 transmits a second video stream (e.g., a video stream captured on the client device 2) to the client device 1 through the video data channel and the audio data channel. Furthermore, as shown in act 410 of FIG. 4, the client device 1 renders the first and second video stream. Likewise, as shown in act 412 of FIG. 4, the client device 2 also renders the first and second video stream.

As further shown in act 414 of FIG. 4, the client device 1 initiates a shared AR scene during the video call with the client device 2. As shown in act 416 of FIG. 4, the client device 1 (upon initiating the AR scene) transmits AR scene data (e.g., a first video stream and video processing data for the first video stream) to the client device 2 via the video call streams 420. Indeed, as illustrated in FIG. 4, the client device 1 transmits video data (e.g., video stream) and video processing data through the video call streams 420 to the client device 2. Indeed, as shown in FIG. 4, the shared AR scene video call system 106 can enable the client device 1 to transmit the video data and the video processing data as combined data within a video data channel. In some cases, the shared AR scene video call system 106 can enable the client device 1 to transmit the video data via the video data channel and the video processing data via the video processing data channel.

As further shown in act 418 of FIG. 4, the client device 2 (upon detecting an initiation of an AR scene from a participant device on the video call) also transmits AR scene data (e.g., a second video stream and video processing data for the second video stream) to the client device 1 via the video call streams 420. Indeed, as shown in FIG. 4, the shared AR scene video call system 106 can enable the client device 2 to transmit the video data and the video processing data as combined data within a video data channel. In some cases, the shared AR scene video call system 106 can enable the client device 2 to transmit the video data via the video data channel and the video processing data via the video processing data channel.

In some cases, as shown in FIG. 4, the client devices can transmit modified video streams. For example, prior to transmitting video data, a client device can modify the video data to prepare the video for utilization as a video texture in an AR effect. For instance, a client device can modify a digital video by cropping the digital video to display particular aspects of the video (e.g., a face of a participant, removal of background information). In some cases, the client device can modify saturation, exposure, sharpness, and/or contrast of a digital video prior to transmitting the digital video (e.g., to assist in a video texture rendering process). In one or more implementations, the client device can modify a color space of a digital video prior to (or after receiving) the digital video (e.g., RGB to YUV, YUV to RGB).

Furthermore, in some cases, the shared AR scene video call system 106 can enable a client device to render AR effects (e.g., AR glasses, AR facial hair, AR makeup, AR hair, facial appearances through AR) within a digital video (e.g., on a participant) prior to transmitting the video data to participant client devices. Indeed, in some implementations, the shared AR scene video call system 106 enables client devices to render videos having AR effects as video textures to include within AR scenes as AR effects.

As further shown in FIG. 4, the client device 1 can transmit various AR data through an AR data channel. For example, the shared AR scene video call system 106 can also enable one or more of the client devices to transmit AR data (e.g., AR element identifiers, AR element information, logic data objects, object vectors, participant identifiers) through an AR data channel to cause the other client device to render an AR element on a video captured by the other client device.

For example, utilizing the AR data channel, the shared AR scene video call system 106 can enable shared AR environments (and/or AR effects) during a video call that share AR environment scenes (and effects). In addition to AR environment scenes within video calls, the shared AR scene video call system 106 can, via the AR data channel, also facilitate transitions of (and interactions with) AR objects (e.g., within AR environment scenes) between captured videos of multiple client devices participating in the video call. Furthermore, the shared AR scene video call system 106 can, via the AR data channel, also utilize the transitions of (and interactions with) AR objects between captured videos of multiple client devices to enable AR-based games between participating client devices of a video call.

For instance, the shared AR scene video call system 106 can establish an AR data channel and enable AR effects as described by Jonathan Michael Sherman et al., Utilizing Augmented Reality Data Channel to Enable Shared Augmented Reality Video Calls, U.S. patent application Ser. No. 17/650,484 (filed Feb. 9, 2022) (hereinafter "Sherman"), the contents of which are hereby incorporated by reference in their entirety. Furthermore, in one or more embodiments, the shared AR scene video call system 106 further enables client devices to transmit video processing data via the AR data channel. For example, the shared AR scene video call system 106 can establish the AR data channel (e.g., as described in Sherman) and enable client devices (during a video call) to transmit video processing data via the AR data channel.

In some embodiments, the client devices initialize an AR scene prior to rendering the video textures as AR effects from the transmitted and received AR scene data during the video call. In particular, as shown in FIG. 4, the client devices both initialize the AR scene prior to rendering the video textures as AR effects utilizing a coordination signal 430 (e.g., a Boolean flag, binary trigger). In one or more embodiments, one or more client devices receive the coordination signal 430 and wait until each client device initializes the AR scene to synchronize the shared AR experience across the multiple client devices on the video call. Indeed, upon initializing, the client devices can transmit (through the video call streams 420) to other client devices a message indicating that the client device is ready to render the AR scene (or has initialized the AR scene). In some cases, a client device can initialize an AR scene by retrieving one or more AR elements for the AR scene, loading the one or more AR elements, and/or downloading a particular AR data package to render the AR scene. Upon receiving an initialized message (e.g., as a coordination signal 430) from each client device on a video call, individual client devices can continue to render the AR scene with video textures utilizing received video data and video processing data.

Furthermore, in one or more embodiments, the client devices (or the shared AR scene video call system 106) pause the one or more video streams of the video call until initialization of a shared AR scene is complete on each of the participating client devices. In some cases, the shared AR scene video call system 106 causes the client devices to stream (or display) a loading screen (or loading animation) until the AR scene (and textures) are initialized on each of the participating client devices. Additionally, in one or more embodiments, the shared AR scene video call system 106 enables the client devices to continue to transmit and/or receive audio data via the audio data channel and play audio of one or more client devices on the video call while the AR scene initializes on the plurality of client devices.

As further shown in act 422 of FIG. 4, the client device 1 utilizes a first video stream and video processing data for the first video stream (e.g., generated by the client device 1) to render the first video stream as a first video texture within a first AR effect in an AR scene. Moreover, as shown in act 424 of FIG. 4, the client device 1 utilizes the video data and video processing data received from the client device 2 to render a second video stream as a second video texture within a second AR effect. By doing so, client 1 can present a video call as an AR scene in which the participants of the video call (captured on client devices 1 and 2) are portrayed to be within the AR scene (as the video textures) instead of simply presenting captured videos between the client devices.

Likewise, as shown in act 426 of FIG. 4, the client device 2 utilizes the video data and video processing data received from the client device 1 to render a first video stream as a first video texture within a first AR effect. Moreover, as illustrated in act 428 of FIG. 4, the client device 2 further utilizes the second video stream and video processing data for the second video stream (e.g., generated by the client device 2) to render the second video stream as a second video texture within a first AR effect in an AR scene. As such, client 2 can also present a video call as an AR scene in which the participants of the video call (captured on client devices 1 and 2) are portrayed to be within the AR scene (as the video textures).

In some cases, the client devices render the participant videos as video textures within an AR scene independently. In particular, in one or more embodiments, the client devices receive video data and video processing data from the other client devices participating on the video call. Then, the client devices can locally render the participant videos as video textures within an AR scene independently from other client devices participating on the video call.

Figure 5:
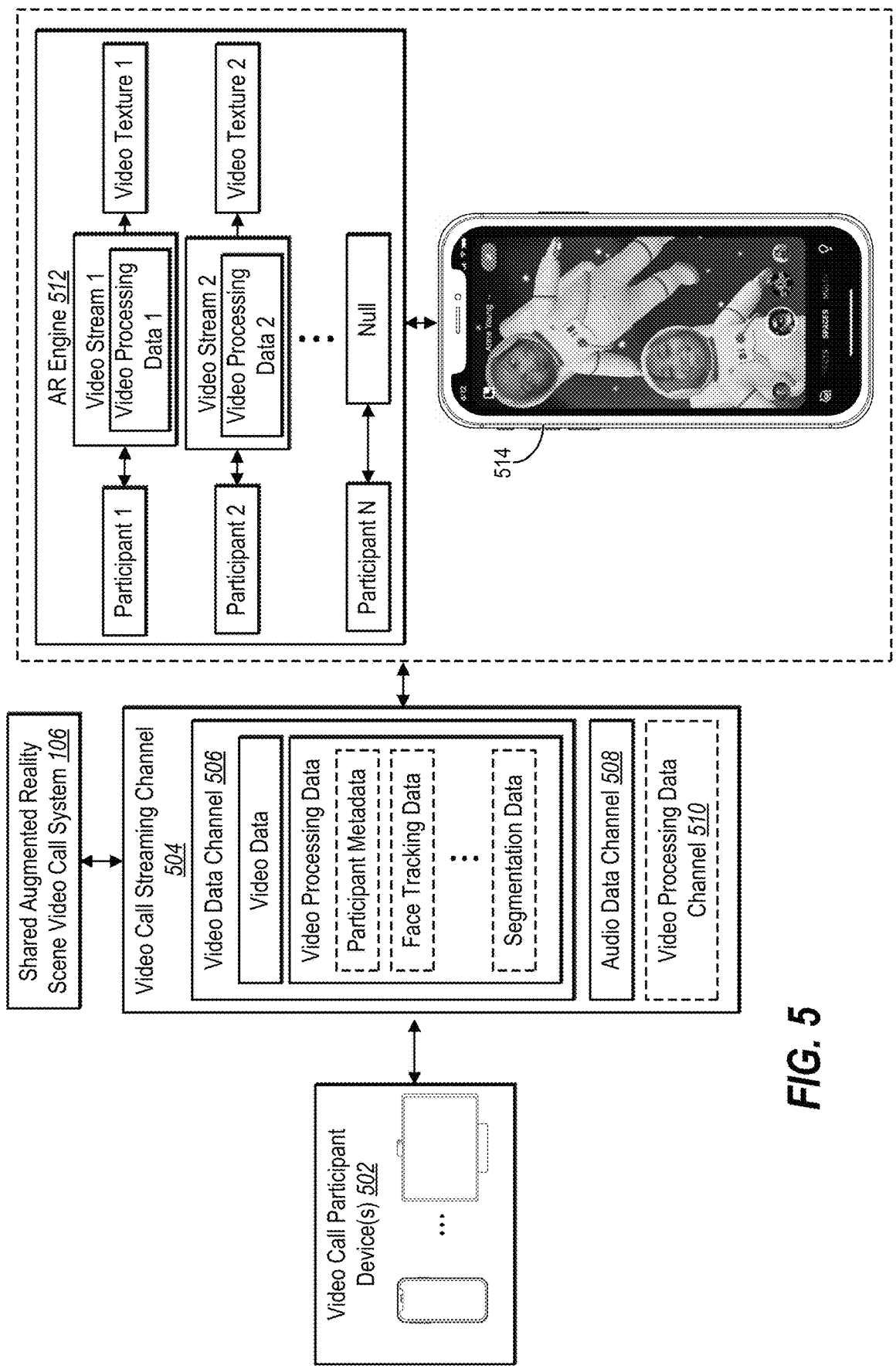
FIG. 5 illustrates an example of a shared AR scene video call system enabling a client device to receive and utilize video processing data from another participant device to render video textures of participants within an AR scene in accordance with one or more implementations.

As mentioned above, the shared AR scene video call system 106 can enable client devices to utilize various types of video processing data to render video textures of participants within an AR scene during a video call. For example, FIG. 5 illustrates a client device receiving and utilizing video processing data from another participant device to render video textures of participants within an AR scene. In particular, FIG. 5 illustrates a client device utilizing an AR engine that utilizes video data and video processing data to render video textures of participants within an AR scene in a self-view display during a video call.

As previously mentioned and as shown in FIG. 5, the shared AR scene video call system 106 establishes a communication between a video call participant device(s) 502 and a client device 514 utilizing a video call streaming channel 504 (having a video data channel 506 and an audio data channel 508) during a video call. As shown in FIG. 5, the video call participant device(s) 502 transmits video data and video processing data through the video call streaming channel 504. More specifically, as shown in FIG. 5, the video call participant device(s) 502 transmits the video data and video processing data (via a video data channel 506) as combined data (e.g., utilizing split video frames). Alternatively, in one or more embodiments, the video call participant device(s) 502 transmits the video data via the video data channel 506 and the video processing data via a separate video processing data channel 510 (as described above).

In some instances, as shown in FIG. 5, the video processing data can include participant metadata. In one or more embodiments, the shared AR scene video call system 106 enables a client device to utilize participant metadata to identify participants to include as video textures in an AR scene, determine a type of AR effect to utilize for the participant in the AR scene, and/or present other information corresponding to the participant. For example, the participant metadata can include a participant identifier (e.g., a participant name, user ID, tag), a status of the participant (e.g., video access status, audio mute status, buffering status, connectivity status), and/or information for the video call (e.g., number of participants, number of devices, AR scene rendering compatibility of devices).

In some embodiments, the participant metadata includes an AR identifier that indicates a type of AR effect or a specific AR effect to utilize for the participant. For example, the AR identifier can indicate a particular AR effect (e.g., a particular AR costume, a particular AR character) selected by a participant of a video call. In some cases, the AR identifier can indicate a type of AR effect (e.g., a 3D AR effect, an avatar, a holograph) selected by a participant of a video call. Indeed, the shared AR scene video call system 106 can enable a client device to utilize participant metadata to determine an AR effect to render using a video depicting a participant.

In one or more implementations, the video processing data can include face tracking data. For example, the shared AR scene video call system 106 can enable a client device to identify, track, and indicate face tracking information from a captured video (e.g., as a mask, as pixel coordinates). In particular, the client device can utilize a face tracking component to identify a participant within a video and generate data that indicates the location of the participant's face within a video. As an example, the client device can generate a mask layer for the video to distinguish between pixels that depict a face and pixels that do not depict face within an image or video frame. In some cases, the client device can determine pixel coordinates that outline a depicted face in the digital video. In one or more embodiments, the shared AR scene video call system 106 can enable a client device to track a face depicted within a digital video using various approaches, such as, machine learning-based face trackers (e.g., neural network classifiers, generative adversarial neural networks) and/or pixel feature detection approaches (e.g., color, intensity, brightness detection).

Subsequently, the shared AR scene video call system 106 can enable client devices to determine segmentation data as video processing data. For example, a client device can analyze a digital video (or digital video frame) to determine salient objects (e.g., participants, pets) portrayed within the digital video (e.g., saliency detection). In one or more embodiments, the client device segments the salient objects from other portions of the digital video as segmentation data. For instance, segmentation data can include a mask, heat map, or a set of pixel coordinates that indicate a salient objects location within a digital video frame.

In some cases, the segmentation data can include a mask or a set of pixel coordinates that indicate a foreground and a background of a digital video frame. For example, the shared AR scene video call system 106 can enable a client device to detect a background (and/or a background) within a digital video. Then, the client device can generate a mask layer, heat map, and/or pixel coordinates to represent the detected background from a foreground of the digital video (as video processing data). In some instances, the shared AR scene video call system 106 can enable a client device to determine depth information from a video frame (e.g., a z-position of objects within the video frame) and utilize the depth information as video processing data.

Moreover, as another example, the shared AR scene video call system 106 can enable a client device to identify alpha channel data as video processing data. In particular, the client device can identify transparency values per-pixel in a digital video frame and utilize the transparency values (e.g., alpha values) as video processing data. Additionally, in some cases, the shared AR scene video call system 106 can enable a client device to identify color channel data (e.g., RGB color space, YUV color space) as video processing data. For example, the client device can identify color values per-pixel in a digital video frame and utilize the color values as video processing data.

Additionally, the shared AR scene video call system 106 can enable a client device to identify (or generate) various types of image masks as video processing data. For example, the client device can identify (or generate) masks for various image properties, such as, but not limited to, brightness intensity mask, exposure intensity mask, highlight intensity masks, shadow intensity masks, specific color masks (e.g., a mask that indicates the presence of a particular color), object segmentation masks, face tracking masks. As mentioned above, the client device can transmit image masks as part of video data (e.g., using a split view frame) or via a video processing data channel to other client devices during a video call.

In some cases, the shared AR scene video call system 106 can enable a client device to identify or determine universal position data for a participant as video processing data. For example, a client device can identify and/or track a position of a participant (or a participant's AR effect) within an AR scene and transmit the position to other client devices during a video call. Indeed, in one or more embodiments, client devices utilize the position data to maintain a persistent position of AR effects of participants relevant to other participants of the video call within the AR scene (e.g., the relative position of each participant in the AR scene is maintained across AR scenes rendered on each client device).

Although one or more embodiments herein illustrate various video processing data identified (or created) by client devices from a video, the shared AR scene video call system 106 can enable a client device to identify a wide variety of aspects and/or characteristics of a video and/or objects depicted within a video as video processing data. For example, the video processing data can include masks and/or pixel coordinates that indicate nose tracking information, eye tracking information, smile tracking information, hair tracking information, and/or user movement information. Furthermore, the video processing data can include masks and/or pixel coordinates that indicate ambient lighting information, color information, video resolution information, aspect ratio information, and/or frame rate information.

As further shown in FIG. 5, the client device 514 receives the video data and the video processing data from the video call streaming channel 504 and utilizes an AR engine 512 to render videos of participants as video textures within AR effects in an AR scene. As shown in FIG. 5, for each participant identified in the video streams of a video call, the client device 514 (in the AR engine 512) generates video textures from videos corresponding to the participants. Then, as shown in FIG. 5, the client device 514 renders the video textures within AR effects in an AR scene presented in a video call interface of the client device 514.

In one or more embodiments and in reference to FIG. 5, the shared AR scene video call system 106 enables a client device to render a video as a video texture within an AR effect for each participant within a video call. For example, the shared AR scene video call system 106 (or the client device) can utilize the video processing data (e.g., participant metadata, face tracking data, and/or participant identifiers) from to identify individual participants from video streams received during a video call. Then, the client device (via an AR engine) can utilize the video data and video processing data identified for each individual participant to render a video texture specifically for each individual participant.

In some cases, the shared AR scene video call system 106 enables the client devices to assign participant identifiers for each participant. Then, in one or more embodiments, shared AR scene video call system 106 enables the client devices to utilize the participant identifiers to track user interactions and/or participation of each participant in the video call. Indeed, the shared AR scene video call system 106 can enable the client devices to utilize the participant identifiers to determine a number of participants on a video call, determine a number of video textures to render in an AR scene, and/or track (or assign) AR effects directed to (or targeted towards) a particular participant.

In some cases, the shared AR scene video call system 106 can enable a client device to render video texture-based AR effects for multiple participants identified in a single video data stream (e.g., from a single client device). For example, a client device can capture multiple participants during a video call (e.g., two or more persons using the same client device for the video call). The shared AR scene video call system 106 can enable the client device to identify and generate video processing data for the multiple participants (e.g., face tracking for each participant and/or segmentation data for each participant) and transmit the video data and video processing data to other client devices on a video call. In some instances, the client device generates a separate video stream for each participant (e.g., cropping a video to focus on a specific participant) and corresponding video processing data for transmission to other client devices during a video call.

Upon receiving video processing data that indicates multiple participants, a receiving client device can utilize the video processing data to separately render videos (e.g., video portions) of each participant as separate video textures within separate AR effects in an AR scene. For example, the client device can utilize the video processing data to determine more than one participant (e.g., person) is captured in a video stream. Then, the client device can render a first portion of the video stream as a first texture to depict a first participant. In addition, the client device can render a second portion of the video stream as a second texture to depict a second participant. Indeed, the shared AR scene video call system 106 can enable client device to render video textures for various numbers of participants present in a single video stream.

In some instances, as shown in FIG. 5, the client device 514 (via the AR engine 512) assigns each identified participant (or participant device) to a video texture slot (e.g., a peer texture object slot). In some implementations, as shown in FIG. 5, the shared AR scene video call system 106 enables the client device 514 (and other client devices on the video call) to include an N number of video texture slots assignable to individual participants (or participant devices). In one or more embodiments, the client device 514 maintains one or more null (open) video texture slots until a new participant is detected during the video call and assigns the newly detected participant to an open video texture slot. In some cases, the client device 514 generates a new video texture slot when a new participant is detected during the video call.

Furthermore, in one or more embodiments, the client device 514 removes or assigns a null value to a video texture slot when a participant exits a video call. In some cases, the client device can reassign the null video texture slot to a new participant detected during a video call or the same participant when the participant reenters the video call. Indeed, although FIG. 5 illustrates the client device 514 rendering video textures for two participants, the shared AR scene video call system 106 can enable client devices (during a video call) to render video textures within AR effects for various numbers of participants.

As further shown in FIG. 5, the shared AR scene video call system 106 can enable the client device 514 (via the AR engine 512) to render videos of multiple participants as video textures within AR effects within a self-view display. In particular, the client device 514 renders and presents the video textures within the AR effects in an AR scene that presents the multiple captured videos in an interface that is similar to the video textures all being captured by the client device 514 (e.g., not in a grid-view display). For example, rather than presenting a rendering of video captures from other client devices in a grid view, the video streams are, instead, received through the AR engine 512 (e.g., similar to videos captured on the client device 514) and then video textures are rendered utilizing the corresponding video processing data of the video streams.

As further shown in FIG. 5, the client device 514 renders an AR scene with video call participants as AR effects in the AR scene (e.g., using video textures). As shown in FIG. 5, the shared AR scene video call system 106 enables the client device 514 to fit videos depicting participants into an AR effect (e.g., using video textures) such that the participants are portrayed as AR characters (or other animations). Indeed, the shared AR scene video call system 106 can enable a client device to depict participants as various character-based AR effects (or animations), such as, but not limited to, within various costumes, as various animals, as various cartoon characters, and/or as various objects).

For example, in some instances, the shared AR scene video call system 106 enables a client device to render a video of a participant as a video texture within an AR effect that represents a character (e.g., within a scene or a video game). In some cases, the shared AR scene video call system 106 enables the client device to render a video of a participant as a video texture within an AR effect that represents an object (e.g., a car, a rocket ship, a flower, the sun, a star). In addition, the shared AR scene video call system 106 can enable a client device to render AR effects (using video textures of participants) that move (e.g., floating, walking, flying, running) or have animated interactions (e.g., jumping, dancing, waving). In some embodiments, the shared AR scene video call system 106 can enable a client device to render the AR effects to move or animate when a user interaction or movement is detected within a video stream of a participant (e.g., a participant waves a hand, laughs, smiles, stands up, sits down).

In some cases, the shared AR scene video call system 106 enables a client device to render a video of a participant as a video texture within an AR effect that is displayed within a video capture of another video call participant. For example, the client device can render an AR effect (from a video texture of a first participant) interacting with a second participant that is captured on a video. For example, the client device can render the AR effect of the first participant (or multiple participants) sitting on a shoulder of the second participant, dancing around the second participant, standing next to the second participant (e.g., as a cartoon or animated AR effect).

In one or more embodiments, the shared AR scene video call system 106 enables a client device to render a video of a participant as a video texture as an avatar that is displayed within an AR scene (or a three- or two-dimensional environment). For example, the shared AR scene video call system 106 can enable a client device to utilize video processing data to impose facial movements on an avatar corresponding to the participant. Then, the shared AR scene video call system 106 can enable the client device to display the avatar (with live actions from a video stream of the participant) as an AR effect, within an AR scene, and/or within a three- or two-dimensional environment).

For example, an avatar can refer to a visually human-like (e.g., anthropomorphic), three-dimensional representation (or persona) of a video call participant user within an AR scene, three-dimensional environment, two-dimensional environment, and/or extended-reality environment. As an example, an avatar can include a three-dimensional representation of a video call participant user that provides a realistic (e.g., accurate, life-like, and/or photorealistic) portrayal of the video call participant user. Additionally, an avatar can also include a three-dimensional representation of a user that provides a simplified (e.g., animated, caricature-like, cartoon-like) portrayal of the video call participant user.

In some cases, the shared AR scene video call system 106 enables a client device to render a video of a participant as a video texture within a hologram (or holographic visual effect). For example, the shared AR scene video call system 106 can enable a client device to render the video of the participant as a projection of light (e.g., to mimic a hologram) within an AR scene, a two- or three-dimensional environment, and/or an extended-reality environment. For example, a hologram can represent one or more light rays (or a light field) that forms an image or three-dimensional image (or video) within a display (e.g., within an AR scene, two- or three-dimensional environment, and/or an extended-reality environment).

In one or more embodiments, an extended-reality environment includes a simulated environment in which users can fully or partially immerse themselves. For example, an extended-reality environment can comprise virtual reality, augmented reality, etc. An extended-reality environment can include objects and elements with which a user can interact. In general, a user participates in a virtual environment using a client device, such as a dedicated extended-reality device (e.g., a virtual reality device, an augmented reality device, or a mixed reality device). In particular, an extended-reality device can comprise a head-mounted display, a smartphone, or another computing device.

In some cases, the shared AR scene video call system 106 can enable client devices to represent various participants of a video call utilizing different visual objects (e.g., as AR effects, avatars, and/or holograms). For example, the client device can utilize separate video textures of the participants to display one participant as an AR effect (as a first visual object) and another participant as an avatar (e.g., as a second visual object) within the AR scene. Indeed, the shared AR scene video call system 106 can enable client devices to render participants during a video call using a variety of combinations of visual objects.

Figure 6:
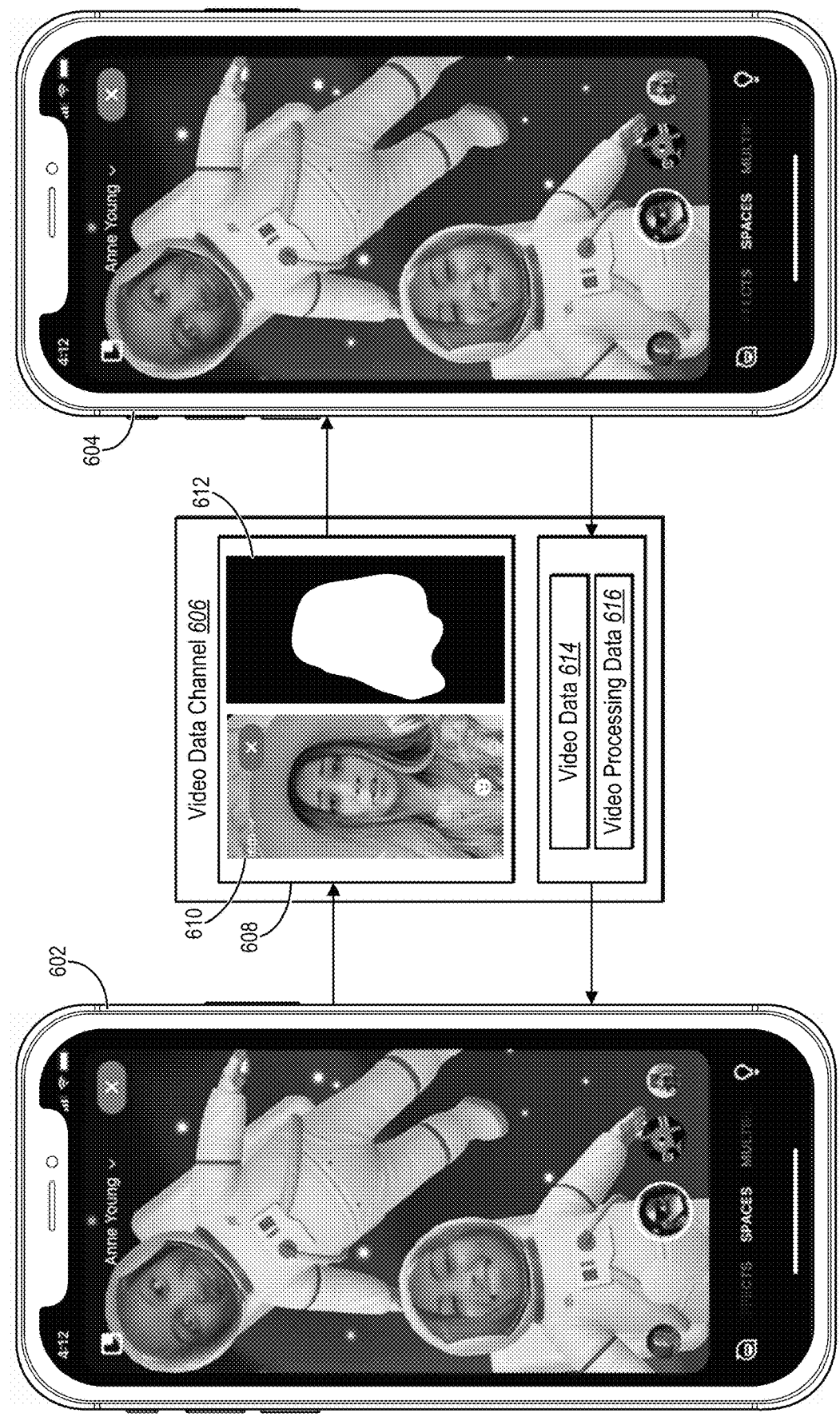
FIG. 6 illustrates an example of a shared AR scene video call system enabling a client device to transmit a combination of video data and video processing data in accordance with one or more implementations.

Furthermore, as mentioned above, in some embodiments, the shared AR scene video call system 106 can enable a client device to combine video data and video processing data to transmit the combined data via a video data channel. For example, FIG. 6 illustrates the shared AR scene video call system 106 enabling client devices to transmit split video frames to transmit a combination of video data and video processing data. As shown in FIG. 6, a client device 602 transmits a split video frame 608 via a video data channel 606 to a client device 604. As illustrated in FIG. 6, the split video frame 608 includes video data 610 in a first portion and video processing data 612 (e.g., a face tracking mask) in a second portion of the split video frame 608.

Indeed, as further shown in FIG. 6, the client device 604 can receive and utilize the split video frame 608 (e.g., having video data and video processing data) to render a video of a participant as a video texture within an AR effect in an AR scene. Likewise, the client device 604 transmits video data 614 and video processing data 616 (e.g., as a split view frame or other combined data format) to the client device 602 to cause the client device 602 to render a video of a participant as a video texture within an AR effect in an AR scene.

In some embodiments, the client device reduces a resolution of a video to fit the video frames and video processing data in a singular video frame. For example, the client device can reduce a 2560×1440-pixel video stream into a 1280×720-pixel video stream to fit the 1280×720-pixel video stream and 1280×720-pixel video processing data into a 2560×1440-pixel video frame (e.g., a split video frame). Indeed, the shared AR scene video call system 106 can enable client devices to transmit video frames and/or split video frames of various resolutions.

As mentioned above, the shared AR scene video call system 106 can enable a client device can generate a split video frame to include various types of video processing data within the split video frame. For example, the client device can generate a split video frame to include segmentation masks and/or face tracking masks as a portion of the video frame. In some cases, the client device can generate a split video frame to include text, binary code, and/or matrices for face tracking coordinates, video visual data (e.g., color data, alpha data, brightness data), and/or participant metadata.

Additionally, in some embodiments, the shared AR scene video call system 106 enables a client device to combine video data and video processing data within a video data channel by utilizing alternating video frames. For example, the shared AR scene video call system 106 can enable a client device to alternate video frames between sending video data and video processing data. To illustrate, a client device can transmit, as a first video frame, a first video frame to another participant client device on the video call. Subsequently, the client device can transmit, as a second video frame, a video processing data for the first video frame to another participant client device on the video call. In some instances, the client device can repeatedly alternate between transmitting a video frame having video data and a video frame having video processing data to another participant client device on the video call (e.g., utilizing a modified frame rate to have both video data and video processing data).

In one or more embodiments, the shared AR scene video call system 106 can enable various additional functionalities within AR scene video calls. For example, the shared AR scene video call system 106 can enable screen image captures and/or screen video captures. Indeed, the shared AR scene video call system 106 can enable a client device to capture screen images and/or videos during an AR scene video call to save and/or share the captured image and/or video on the client device, on a social network, and/or to other users.

Figure 7A:
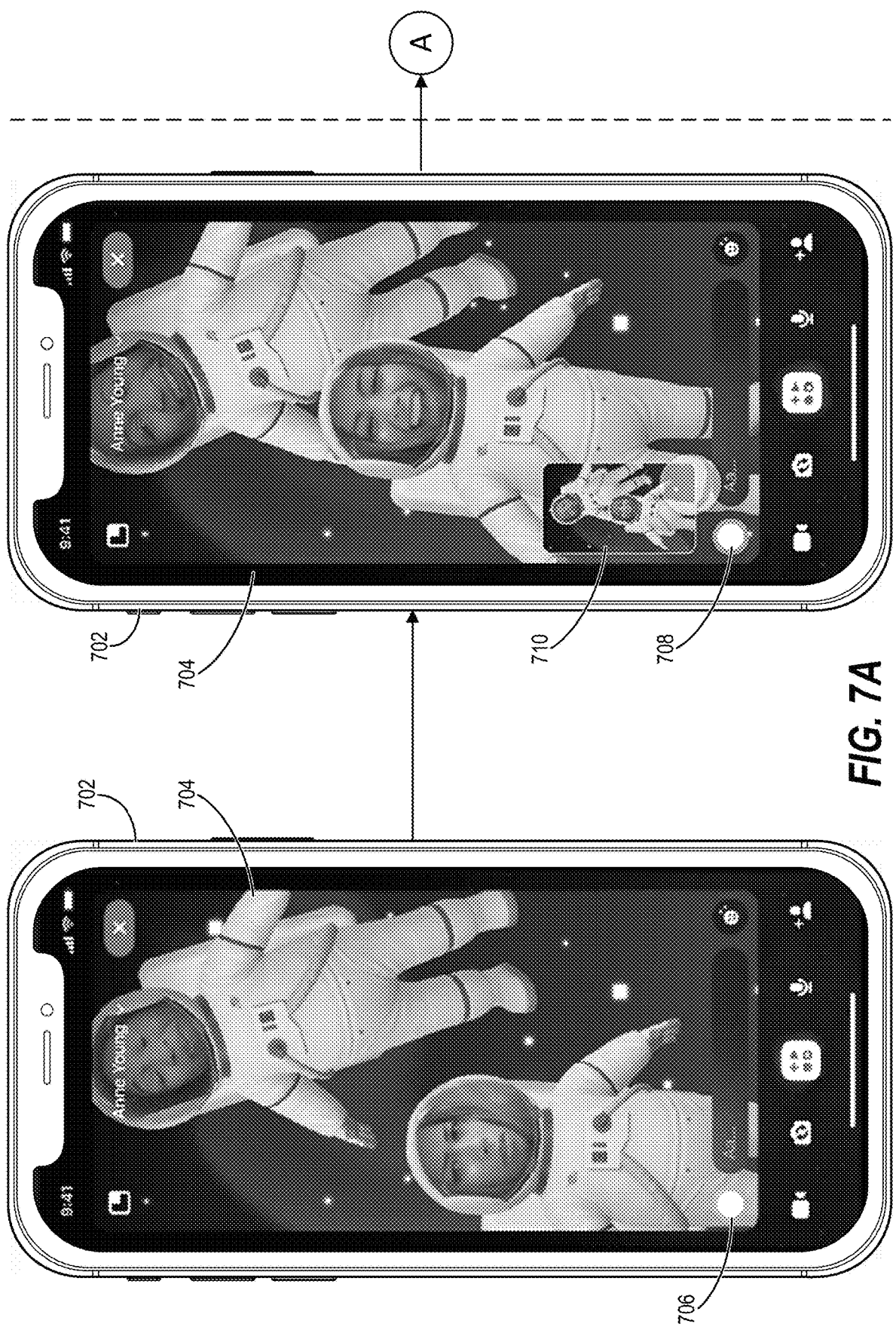
FIGS. 7A and 7B illustrate an example of a shared AR scene video call system enabling a client device rendering an AR scene video call to display selectable options to share image and/or video captures in accordance with one or more implementations.
Figure 7B:

For example, FIGS. 7A and 7B illustrate a client device rendering an AR scene with selectable options to share image and/or video captures of the AR scene video call. For example, as shown in FIG. 7A, a client device 702 can render videos of participants within AR effects in an AR scene 704 during a video call. In addition, as shown in FIG. 7A, the client device 702 can display a selectable option 706 to initiate a screen capture. As further shown in FIG. 7A, upon detecting a user interaction with the selectable option 706, the client device can capture and display an image capture 710 of the AR scene.

Furthermore, as shown in the transition from FIG. 7A to 7B, upon detecting further user interaction (or a hold interaction) with the selectable option 708, the client device can capture a video of the AR scene during the video call and present a video capture 712. In addition, as shown in FIG. 7B, the client device can display a selectable option 714 to share the captured video (e.g., via a social network, an instant message, an email). Moreover, as shown in FIG. 7B, the client device can display a selectable option 716 to delete the captured video.

In addition, as shown in FIG. 7B, the client device 702 can receive user interactions (e.g., a swipe action or a screen tap action) to navigate between different video captures. For example, as shown in FIG. 7B, the client device 702 can present an additional video capture 718 that is captured during a video call (within an AR scene). Indeed, the client device 702 can present a variety of images and videos captured during a video call. In one or more embodiments, as shown in FIG. 7B, the shared AR scene video call system 106 can enable a client device to capture videos or images from multiple camera angles for the same video call in the same AR scene. In particular, the client device can capture an image or video from a first camera angle depicting the participant AR effects from a first vantage point (e.g., floating together in space) and a second camera angle depicting a close up of a participant AR effect experiencing an animation as a second vantage point.

Figure 8:
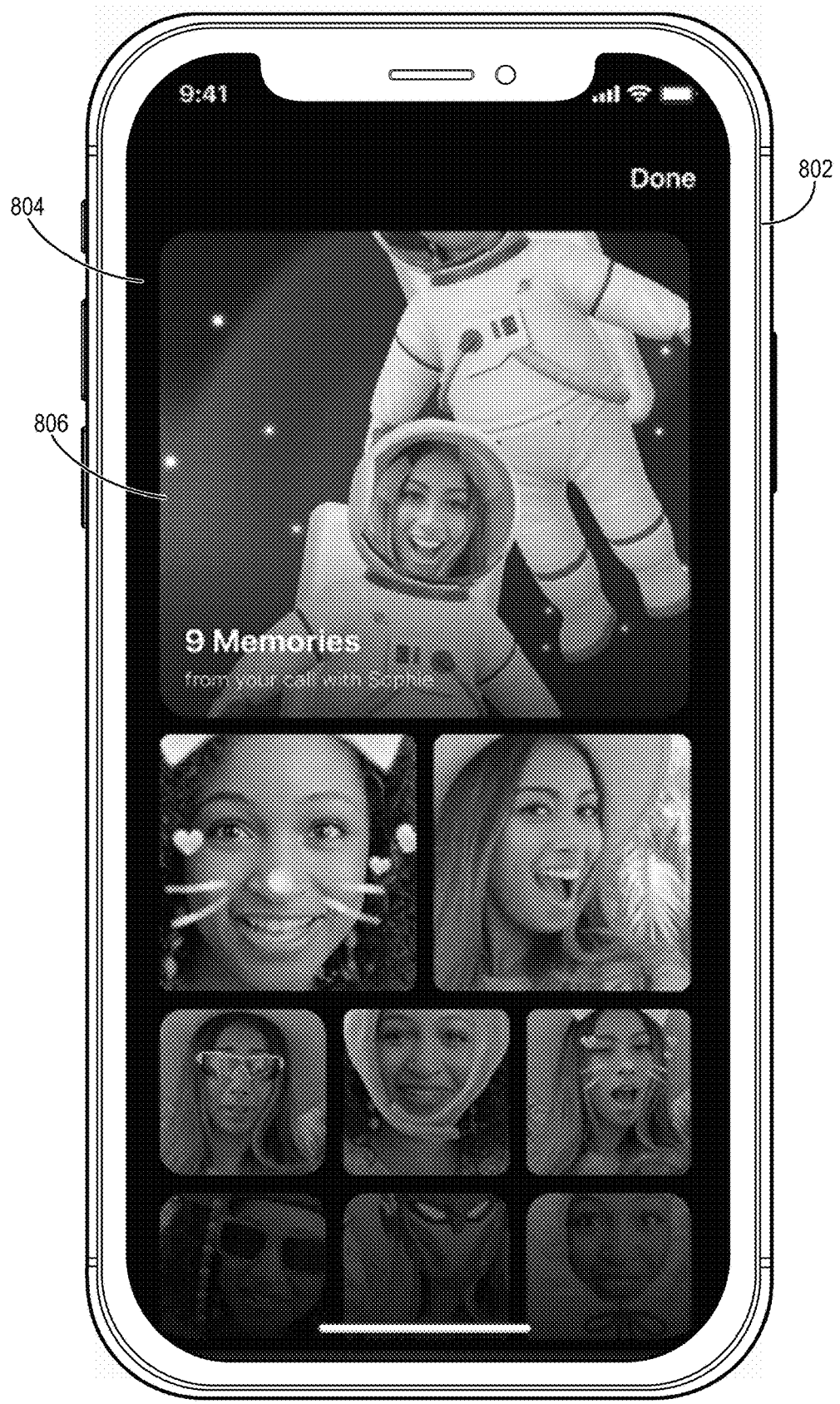
FIG. 8 illustrates an example of a shared AR scene video call system enabling a client device to display memories from AR scene video calls in accordance with one or more implementations.

Additionally, the shared AR scene video call system 106 can enable a client device to present (or display) various media captures or memories from an AR scene video call (upon ending a video call or within a video call history menu). For example, FIG. 8 illustrates a client device displaying various media or memories from AR scene video calls. As shown in FIG. 8, the client device 802 can display, within a video call capture menu interface 804, captured images and videos 806 from one or more historical video calls between participants.

Figure 9:
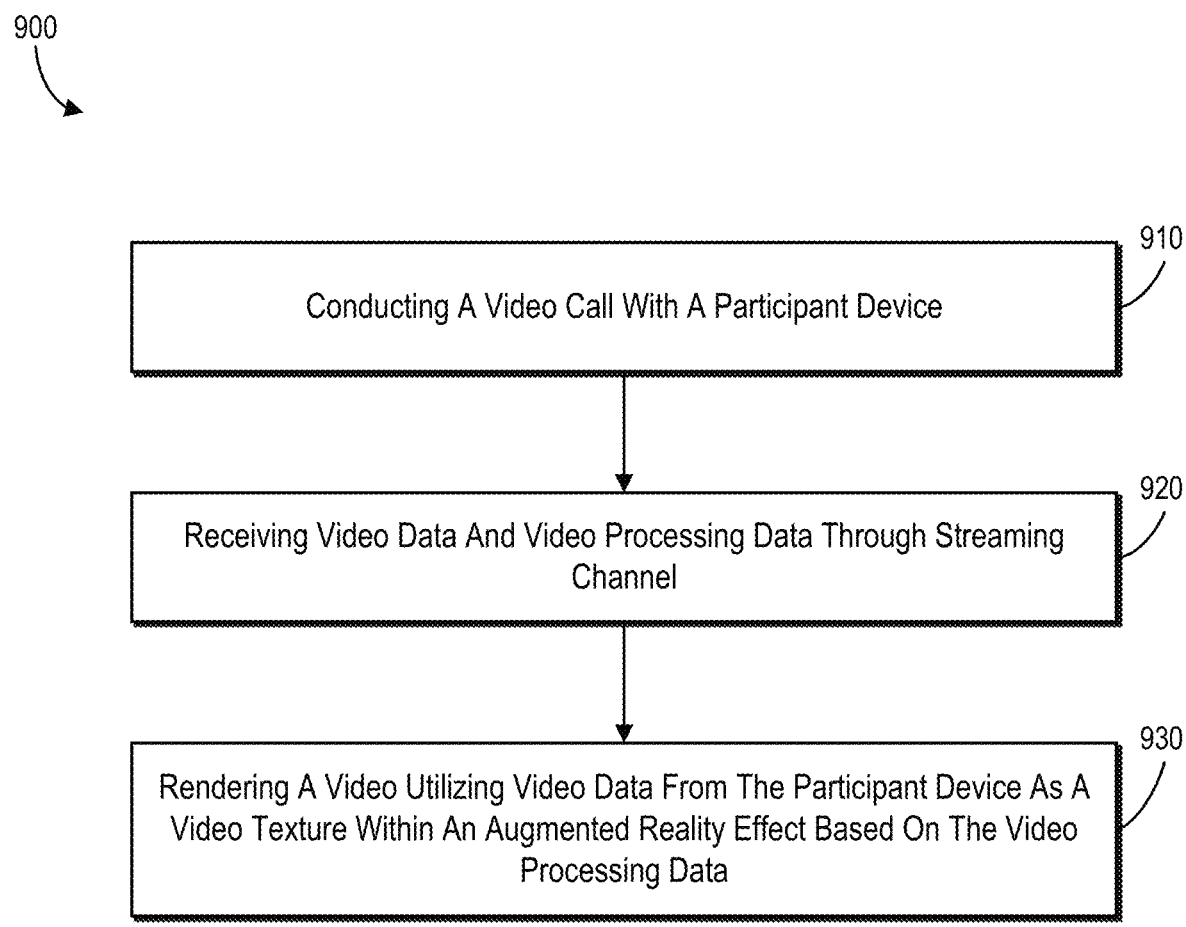
FIG. 9 illustrates a flowchart of a series of acts for rendering videos of video call participants as video textures within AR effects during a video call in accordance with one or more implementations.
Figure 10:
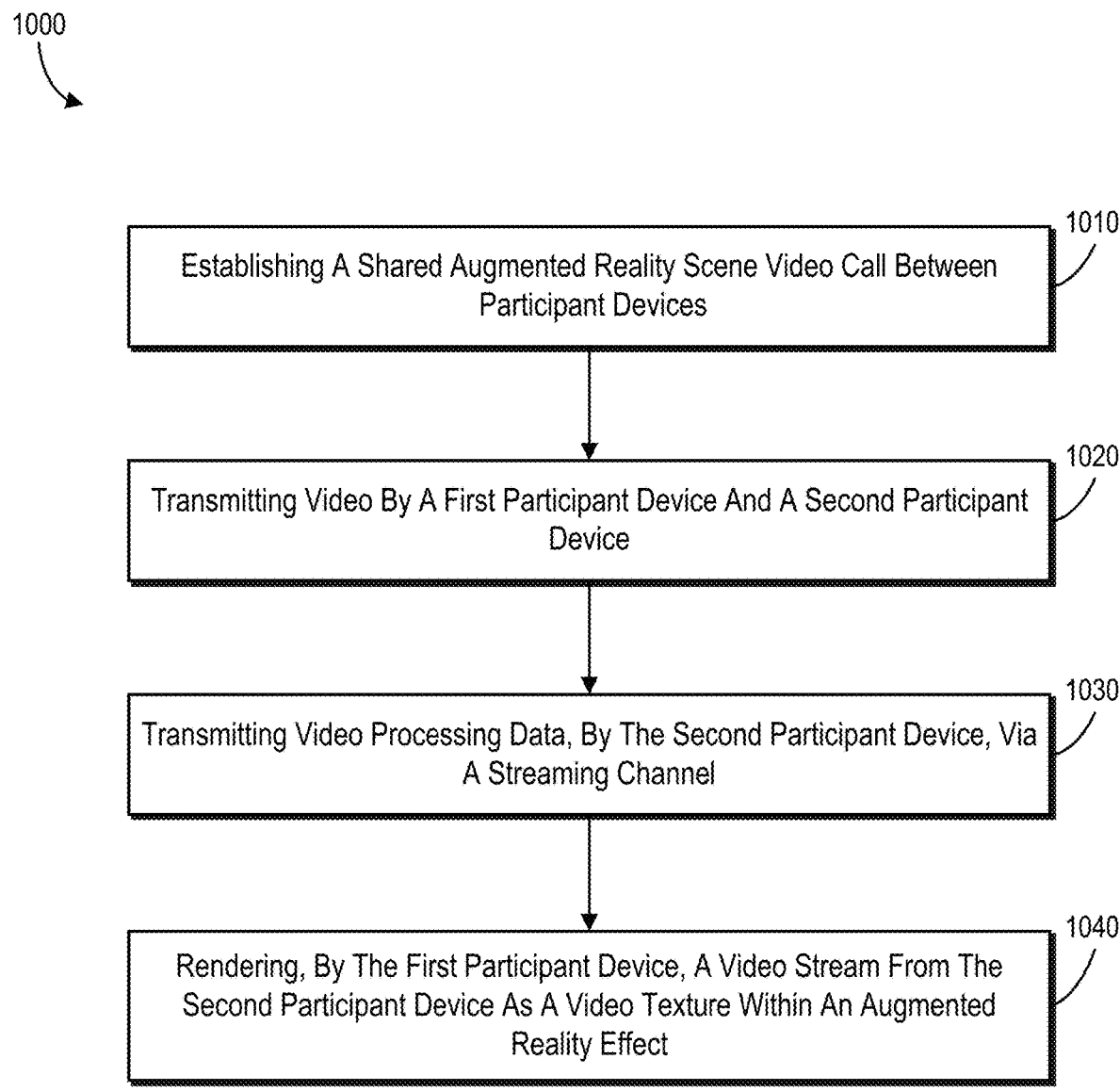
FIG. 10 illustrates a flowchart of a series of acts for establishing a shared augmented reality scene video call in accordance with one or more implementations.

FIGS. 1-8, the corresponding text and the examples provide a number of different methods, systems, devices, and non-transitory computer-readable media of the shared AR scene video call system 106. In addition to the foregoing, one or more embodiments can also be described in terms of flowcharts comprising acts for accomplishing particular results, as shown in FIGS. 9 and 10. FIGS. 9 and 10 may be performed with more or fewer acts. Furthermore, the acts shown in FIGS. 9 and 10 may be performed in different orders. Additionally, the acts described in FIG. 9 and the acts described in FIG. 10 may be repeated or performed in parallel with one another or in parallel with different instances of the same or similar acts.

For example, FIG. 9 illustrates a flowchart of a series of acts 900 for rendering videos of video call participants as video textures within AR effects during a video call in accordance with one or more implementations. While FIG. 9 illustrates acts according to one or more embodiments, alternative embodiments may omit, add to, reorder, and/or modify any of the acts shown in FIG. 9. In some implementations, the acts of FIG. 9 are performed as part of a method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one processor. The system can further include a non-transitory computer-readable medium comprising instructions that, when executed by the at least one processor, cause the system to perform the acts of FIG. 9.

As shown in FIG. 9, the series of acts 900 includes an act 910 of conducting a video call with a participant device. For example, the act 910 can include conducting, by a client device, a video call with a participant device through a streaming channel established for the video call from the participant device. Furthermore, the series of acts 900 includes an act 920 of receiving video data and video processing data through a streaming channel. For example, the act 920 can include receiving video data and video processing data from a participant device through a streaming channel established for a video call with a participant device. For instance, video processing data can include at least one of face tracking data, segmentation data, alpha channel data, mask data, or participant metadata corresponding to video data from a participant device.

In certain instances, the act 920 includes receiving video data and video processing data through a streaming channel by receiving a split video frame comprising a digital video captured on a participant device within a first portion of the split video frame and the video processing data within a second portion of the split video frame through a video data channel. In some embodiments, the act 920 includes receiving video data through a streaming channel by receiving video data through a video data channel established for a video call. Moreover, the act 920 can include receiving video processing data through a streaming channel by receiving the video processing data through a video processing data channel established for a video call.

Moreover, the act 920 can include capturing additional video data by a client device and generating additional video processing data from the additional video data captured by the client device. Additionally, the act 920 can include receiving additional video data and additional video processing data through a streaming channel from an additional participant device to establish a video call between a client device, a participant device, and an additional participant device. Moreover, the act 920 can include receiving, through a streaming channel, a coordination signal indicating that a participant device is ready to render augmented reality elements utilizing video textures of videos corresponding to a video call.

Additionally, the series of acts 900 includes an act 930 of rendering a video utilizing video data from the participant device as a video texture within an augmented reality effect based on the video processing data. For example, the act 930 can include rendering, within a digital video call interface displayed within a client device, a video utilizing video data from a participant device as a video texture within an augmented reality effect based on video processing data from the participant device. Furthermore, the act 930 can include rendering, within a digital video call interface displayed within a client device, an additional video utilizing the additional video data as an additional video texture within an additional augmented reality effect based on additional video processing data. In some cases, the act 930 includes displaying a video texture within an augmented reality effect and an additional video texture within an additional augmented reality effect within an augmented reality scene. In some instances, the act 930 includes rendering, within a digital video call interface displayed within a client device, an additional video utilizing additional video data from an additional participant device as an additional video texture within an additional augmented reality effect based on additional video processing data from an additional participant device.

Furthermore, the act 930 can include rendering, within a digital video call interface displayed within a client device, a video texture within an augmented reality effect to depict a participant captured in a video from a participant device within an augmented reality scene as the augmented reality effect. In addition, the act 930 can include generating a video texture by utilizing video processing data to fit a participant depicted within a video from a participant device into an augmented reality effect. Furthermore, the act 930 can include assigning universal positions for an augmented reality effect and an additional augmented reality effect within an augmented reality scene (where the universal positions are shared between a computing device and a participant device). In some cases, the act 930 includes rendering, within a digital video call interface, a video utilizing video data from a participant device as a video texture within an augmented reality effect based on receiving a coordination signal.

Additionally, the act 930 can include identifying, utilizing a video processing data, a person depicted within a video captured at the participant device and rendering a video utilizing video data from a participant device as a video texture within an augmented reality effect by rendering video of the person as the video texture within the augmented reality effect. Furthermore, the act 930 can include identifying, utilizing video processing data, an additional person depicted within a video captured at a participant device and rendering, within a digital video call interface displayed within a client device, video of the additional person as an additional video texture within an additional augmented reality effect.

Turning now to FIG. 10, FIG. 10 illustrates a flowchart of a series of acts 1000 for establishing a shared augmented reality scene video call in accordance with one or more implementations. While FIG. 10 illustrates acts according to one or more embodiments, alternative embodiments may omit, add to, reorder, and/or modify any of the acts shown in FIG. 10. In some implementations, the acts of FIG. 10 are performed as part of a method. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one processor. The system can further include a non-transitory computer-readable medium comprising instructions that, when executed by the at least one processor, cause the system to perform the acts of FIG. 10.

As shown in FIG. 10, the series of acts 1000 includes an act 1010 of establishing a shared augmented reality scene video call between participant devices. For example, the act 1010 can include establishing a shared augmented reality scene video call between a first participant device and a second participant device by establishing a streaming channel between the first participant device and the second participant device.

Furthermore, the series of acts 1000 includes an act 1020 of a first participant device and a second participant device transmitting a video. For example, the act 1020 can include a first participant device capturing a first video stream and transmitting the first video stream to a second participant device via a streaming channel. Moreover, the act 1020 can include a second participant device capturing a second video stream and transmitting a second video stream to a first participant device via a streaming channel.

Additionally, the series of acts 1000 includes an act 1030 of the second participant device transmitting video processing data via a streaming channel. In some cases, the act 1030 includes a second participant device transmitting video processing data of a second video stream to a first participant device via a streaming channel. In some implementations, the act 1030 includes a first participant device transmitting video processing data of a first video stream to a second participant device via a streaming channel. In one or more embodiments, the act 1030 includes a second participant device transmitting a second video stream and video processing data of the second video stream to a first participant device via a streaming channel by utilizing a split video frame having the video data and the video processing data. In some implementations, the act 1030 includes a second participant device transmitting a second video stream and video processing data of the second video stream to a first participant device by transmitting the second video stream to the first participant device via a video data channel and transmitting the video processing data of the second video stream to the first participant device via a video processing data channel.

Moreover, the series of acts 1000 includes an act 1040 of the first participant device rendering a video stream from the second participant device as a video texture within an augmented reality effect. In some cases, the act 1040 includes a first participant device rendering, within a digital video call interface displayed within the first participant device, a second video stream from a second participant device as a video texture within an augmented reality effect in a shared augmented reality scene video call utilizing video processing data of the second video stream. Furthermore, the act 1040 can include a first participant device rendering, within a digital video call interface displayed within the first participant device, a first video stream captured on the first participant device as an additional video texture within an additional augmented reality effect in a shared augmented reality scene video call utilizing video processing data of the first video stream. Additionally, the act 1040 can include a second participant device rendering, within an additional digital video call interface displayed within the second participant device, a first video stream from a first participant device as an additional video texture within an additional augmented reality effect in a shared augmented reality scene video call utilizing video processing data of the first video stream.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
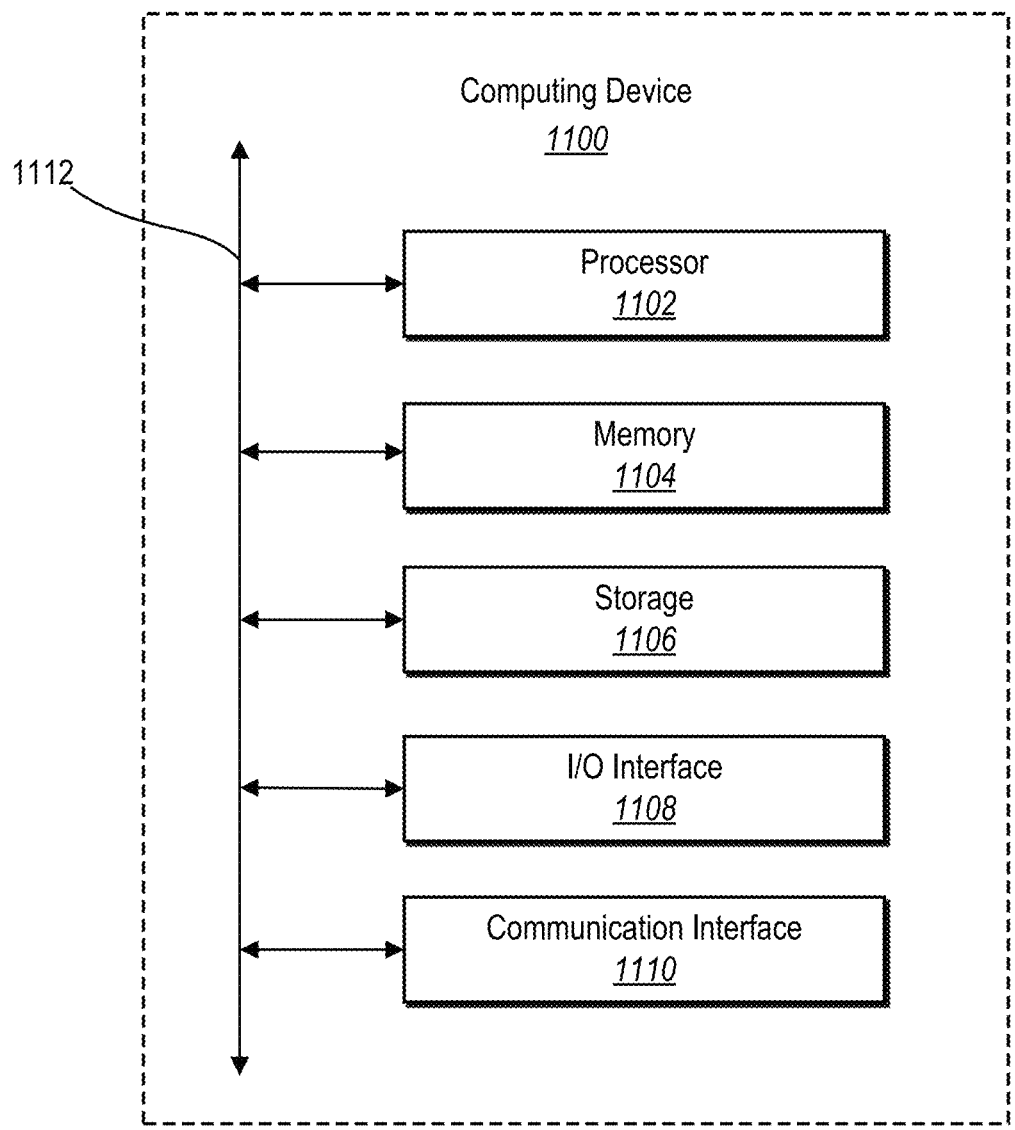
FIG. 11 illustrates a block diagram of an example computing device in accordance with one or more implementations.

FIG. 11 illustrates a block diagram of an example computing device 1100 that may be configured to perform one or more of the processes described above. One will appreciate that one or more computing devices, such as the computing device 1100 may represent the computing devices described above (e.g., server device(s) 102 and/or a client devices 110a, 110b-110n). In one or more embodiments, the computing device 1100 may be a mobile device (e.g., a mobile telephone, a smartphone, a PDA, a tablet, a laptop, a camera, a tracker, a watch, a wearable device, a head mounted display, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other. As an example, the bus 1112 may include one or more types of buses.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g., wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

FIG. 12 illustrates an example network environment 1200 of a social networking system. Network environment 1200 includes a client device 1206, a networking system 1202 (e.g., a social networking system and/or an electronic messaging system), and a third-party system 1208 connected to each other by a network 1204. Although FIG. 12 illustrates a particular arrangement of client device 1206, networking system 1202, third-party system 1208, and network 1204, this disclosure contemplates any suitable arrangement of client device 1206, networking system 1202, third-party system 1208, and network 1204. As an example and not by way of limitation, two or more of client device 1206, networking system 1202, and third-party system 1208 may be connected to each other directly, bypassing network 1204. As another example, two or more of client device 1206, networking system 1202, and third-party system 1208 may be physically or logically co-located with each other in whole or in part. Moreover, although FIG. 12 illustrates a particular number of client devices 1206, networking systems 1202, third-party systems 1208, and networks 1204, this disclosure contemplates any suitable number of client devices 1206, networking systems 1202, third-party systems 1208, and networks 1204. As an example and not by way of limitation, network environment 1200 may include multiple client device 1206, networking systems 1202, third-party systems 1208, and networks 1204.

This disclosure contemplates any suitable network 1204. As an example and not by way of limitation, one or more portions of network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 may include one or more networks 1204.

Links may connect client device 1206, networking system 1202, and third-party system 1208 to communication network 1204 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client device 1206 may be an electronic device including hardware, software, or embedded logic components or a combination of two or more such components and capable of carrying out the appropriate functionalities implemented or supported by client device 1206. As an example and not by way of limitation, a client device 1206 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1206. A client device 1206 may enable a network user at client device 1206 to access network 1204. A client device 1206 may enable its user to communicate with other users at other client devices 1206.

In particular embodiments, client device 1206 may include a web browser, and may have one or more add-ons, plug-ins, or other extensions. A user at client device 1206 may enter a Uniform Resource Locator (URL) or other address directing the web browser to a particular server (such as server, or a server associated with a third-party system 1208), and the web browser may generate a Hyper Text Transfer Protocol (HTTP) request and communicate the HTTP request to server. The server may accept the HTTP request and communicate to client device 1206 one or more Hyper Text Markup Language (HTML) files responsive to the HTTP request. Client device 1206 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1202 may be a network-addressable computing system that can host an online social network. Networking system 1202 may generate, store, receive, and send social-networking data, such as, for example, user-profile data, concept-profile data, social-graph information, or other suitable data related to the online social network. Networking system 1202 may be accessed by the other components of network environment 1200 either directly or via network 1204. In particular embodiments, networking system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, a networking system 1202, or a third-party system 1208 to manage, retrieve, modify, add, or delete, the information stored in data store.

In particular embodiments, networking system 1202 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1202 may provide users of the online social network the ability to communicate and interact with other users. In particular embodiments, users may join the online social network via networking system 1202 and then add connections (e.g., relationships) to a number of other users of networking system 1202 that they want to be connected to. Herein, the term "friend" may refer to any other user of networking system 1202 with whom a user has formed a connection, association, or relationship via networking system 1202.

In particular embodiments, networking system 1202 may provide users with the ability to take actions on various types of items or objects, supported by networking system 1202. As an example and not by way of limitation, the items and objects may include groups or social networks to which users of networking system 1202 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1202 or by an external system of third-party system 1208, which is separate from networking system 1202 and coupled to networking system 1202 via a network 1204.

In particular embodiments, networking system 1202 may be capable of linking a variety of entities. As an example and not by way of limitation, networking system 1202 may enable users to interact with each other as well as receive content from third-party systems 1208 or other entities, or to allow users to interact with these entities through an application programming interfaces (API) or other communication channels.

In particular embodiments, a third-party system 1208 may include one or more types of servers, one or more data stores, one or more interfaces, including but not limited to APIs, one or more web services, one or more content sources, one or more networks, or any other suitable components, e.g., that servers may communicate with. A third-party system 1208 may be operated by a different entity from an entity operating networking system 1202. In particular embodiments, however, networking system 1202 and third-party systems 1208 may operate in conjunction with each other to provide social-networking services to users of networking system 1202 or third-party systems 1208. In this sense, networking system 1202 may provide a platform, or backbone, which other systems, such as third-party systems 1208, may use to provide social-networking services and functionality to users across the Internet.

In particular embodiments, a third-party system 1208 may include a third-party content object provider. A third-party content object provider may include one or more sources of content objects, which may be communicated to a client device 1206. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1202 also includes user-generated content objects, which may enhance a user's interactions with networking system 1202. User-generated content may include anything a user can add, upload, send, or "post" to networking system 1202. As an example and not by way of limitation, a user communicates posts to networking system 1202 from a client device 1206. Posts may include data such as status updates or other textual data, location information, photos, videos, links, music or other similar data or media. Content may also be added to networking system 1202 by a third-party through a "communication channel," such as a newsfeed or stream.

In particular embodiments, networking system 1202 may include a variety of servers, sub-systems, programs, modules, logs, and data stores. In particular embodiments, networking system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1202 may also include suitable components such as network interfaces, security mechanisms, load balancers, failover servers, management-and-network-operations consoles, other suitable components, or any suitable combination thereof. In particular embodiments, networking system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1202 to one or more client devices 1206 or one or more third-party system 1208 via network 1204. The web server may include a mail server or other messaging functionality for receiving and routing messages between networking system 1202 and one or more client devices 1206. An API-request server may allow a third-party system 1208 to access information from networking system 1202 by calling one or more APIs. An action logger may be used to receive communications from a web server about a user's actions on or off networking system 1202. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from client device 1206 responsive to a request received from client device 1206. Authorization servers may be used to enforce one or more privacy settings of the users of networking system 1202. A privacy setting of a user determines how particular information associated with a user can be shared. The authorization server may allow users to opt in to or opt out of having their actions logged by networking system 1202 or shared with other systems (e.g., third-party system 1208), such as, for example, by setting appropriate privacy settings. Third-party-content-object stores may be used to store content objects received from third parties, such as a third-party system 1208. Location stores may be used for storing location information received from client devices 1206 associated with users. Advertisement-pricing modules may combine social information, the current time, location information, or other suitable information to provide relevant advertisements, in the form of notifications, to a user.

FIG. 13 illustrates example social graph 1300. In particular embodiments, networking system 1202 may store one or more social graphs 1300 in one or more data stores. In particular embodiments, social graph 1300 may include multiple nodes—which may include multiple user nodes 1302 or multiple concept nodes 1304—and multiple edges 1306 connecting the nodes. Example social graph 1300 illustrated in FIG. 13 is shown, for didactic purposes, in a two-dimensional visual map representation. In particular embodiments, a networking system 1202, client device 1206, or third-party system 1208 may access social graph 1300 and related social-graph information for suitable applications. The nodes and edges of social graph 1300 may be stored as data objects, for example, in a data store (such as a social-graph database). Such a data store may include one or more searchable or query able indexes of nodes or edges of social graph 1300.

In particular embodiments, a user node 1302 may correspond to a user of networking system 1202. As an example and not by way of limitation, a user may be an individual (human user), an entity (e.g., an enterprise, business, or third-party application), or a group (e.g., of individuals or entities) that interacts or communicates with or over networking system 1202. In particular embodiments, when a user registers for an account with networking system 1202, networking system 1202 may create a user node 1302 corresponding to the user, and store the user node 1302 in one or more data stores. Users and user nodes 1302 described herein may, where appropriate, refer to registered users and user nodes 1302 associated with registered users. In addition or as an alternative, users and user nodes 1302 described herein may, where appropriate, refer to users that have not registered with networking system 1202. In particular embodiments, a user node 1302 may be associated with information provided by a user or information gathered by various systems, including networking system 1202. As an example and not by way of limitation, a user may provide his or her name, profile picture, contact information, birth date, sex, marital status, family status, employment, education background, preferences, interests, or other demographic information. In particular embodiments, a user node 1302 may be associated with one or more data objects corresponding to information associated with a user. In particular embodiments, a user node 1302 may correspond to one or more webpages.

In particular embodiments, a concept node 1304 may correspond to a concept. As an example and not by way of limitation, a concept may correspond to a place (such as, for example, a movie theater, restaurant, landmark, or city); a website (such as, for example, a website associated with networking system 1202 or a third-party website associated with a web-application server); an entity (such as, for example, a person, business, group, sports team, or celebrity); a resource (such as, for example, an audio file, video file, digital photo, text file, structured document, or application) which may be located within networking system 1202 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1304 may be associated with information of a concept provided by a user or information gathered by various systems, including networking system 1202. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more webpages.

In particular embodiments, a node in social graph 1300 may represent or be represented by a webpage (which may be referred to as a "profile page"). Profile pages may be hosted by or accessible to networking system 1202. Profile pages may also be hosted on third-party websites associated with a third-party system 1208. As an example and not by way of limitation, a profile page corresponding to a particular external webpage may be the particular external webpage and the profile page may correspond to a particular concept node 1304. Profile pages may be viewable by all or a selected subset of other users. As an example and not by way of limitation, a user node 1302 may have a corresponding user-profile page in which the corresponding user may add content, make declarations, or otherwise express himself or herself. As another example and not by way of limitation, a concept node 1304 may have a corresponding concept-profile page in which one or more users may add content, make declarations, or express themselves, particularly in relation to the concept corresponding to concept node 1304.

In particular embodiments, a concept node 1304 may represent a third-party webpage or resource hosted by a third-party system 1208. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1206 to send to networking system 1202 a message indicating the user's action. In response to the message, networking system 1202 may create an edge (e.g., an "eat" edge) between a user node 1302 corresponding to the user and a concept node 1304 corresponding to the third-party webpage or resource and store edge 1306 in one or more data stores.

In particular embodiments, a pair of nodes in social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, networking system 1202 may send a "friend request" to the second user. If the second user confirms the "friend request," networking system 1202 may create an edge 1306 connecting the first user's user node 1302 to the second user's user node 1302 in social graph 1300 and store edge 1306 as social-graph information in one or more of data stores. In the example of FIG. 13, social graph 1300 includes an edge 1306 indicating a friend relation between user nodes 1302 of user "A" and user "B" and an edge indicating a friend relation between user nodes 1302 of user "C" and user "B." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like," "attended," "played," "listened," "cooked," "worked at," or "watched" a concept, each of which may correspond to an edge type or subtype. A concept-profile page corresponding to a concept node 1304 may include, for example, a selectable "check in" icon (such as, for example, a clickable "check in" icon) or a selectable "add to favorites" icon. Similarly, after a user clicks these icons, networking system 1202 may create a "favorite" edge or a "check in" edge in response to a user's action corresponding to a respective action. As another example and not by way of limitation, a user (user "C") may listen to a particular song ("Ramble On") using a particular application (MUSIC, which is an online music application). In this case, networking system 1202 may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, networking system 1202 may create a "played" edge 1306 (as illustrated in FIG. 13) between concept nodes 1304 corresponding to the song and the application to indicate that the particular song was played by the particular application. In this case, "played" edge 1306 corresponds to an action performed by an external application (MUSIC) on an external audio file (the song "Imagine"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "E" and concept node 1304 for "MUSIC").

In particular embodiments, networking system 1202 may create an edge 1306 between a user node 1302 and a concept node 1304 in social graph 1300. As an example and not by way of limitation, a user viewing a concept-profile page (such as, for example, by using a web browser or a special-purpose application hosted by the user's client device 1206) may indicate that he or she likes the concept represented by the concept node 1304 by clicking or selecting a "Like" icon, which may cause the user's client device 1206 to send to networking system 1202 a message indicating the user's liking of the concept associated with the concept-profile page. In response to the message, networking system 1202 may create an edge 1306 between user node 1302 associated with the user and concept node 1304, as illustrated by "like" edge 1306 between the user and concept node 1304. In particular embodiments, networking system 1202 may store an edge 1306 in one or more data stores. In particular embodiments, an edge 1306 may be automatically formed by networking system 1202 in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 1202). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1202 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1202) or RSVP (e.g., through networking system 1202) to an event associated with the advertisement. In addition or as an alternative, an advertisement may include social-networking-system context directed to the user. As an example and not by way of limitation, an advertisement may display information about a friend of the user within networking system 1202 who has taken an action associated with the subject matter of the advertisement.

In particular embodiments, networking system 1202 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1208 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1202 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1202 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1202 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1202 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1202 may calculate a coefficient based on a user's actions. Networking system 1202 may monitor such actions on the online social network, on a third-party system 1208, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1202 may calculate a coefficient based on the user's actions with particular types of content. The content may be associated with the online social network, a third-party system 1208, or another suitable system. The content may include users, profile pages, posts, news stories, headlines, instant messages, chat room conversations, emails, advertisements, pictures, video, music, other suitable objects, or any combination thereof. Networking system 1202 may analyze a user's actions to determine whether one or more of the actions indicate an affinity for subject matter, content, other users, and so forth. As an example and not by way of limitation, if a user may make frequently posts content related to "coffee" or variants thereof, networking system 1202 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1202 may calculate a coefficient based on the type of relationship between particular objects. Referencing the social graph 1300, networking system 1202 may analyze the number and/or type of edges 1306 connecting particular user nodes 1302 and concept nodes 1304 when calculating a coefficient. As an example and not by way of limitation, user nodes 1302 that are connected by a spouse-type edge (representing that the two users are married) may be assigned a higher coefficient than a user node 1302 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1202 may determine that the user has a higher coefficient with respect to the first photo than the second photo because having a tagged-in-type relationship with content may be assigned a higher weight and/or rating than having a like-type relationship with content. In particular embodiments, networking system 1202 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1202 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1300. As an example and not by way of limitation, social-graph entities that are closer in the social graph 1300 (i.e., fewer degrees of separation) may have a higher coefficient than entities that are further apart in the social graph 1300.

In particular embodiments, networking system 1202 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1206 of the user). A first user may be more interested in other users or concepts that are closer to the first user. As an example and not by way of limitation, if a user is one mile from an airport and two miles from a gas station, networking system 1202 may determine that the user has a higher coefficient for the airport than the gas station based on the proximity of the airport to the user.

In particular embodiments, networking system 1202 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1202 may provide information that is relevant to user's interests and current circumstances, increasing the likelihood that they will find such information of interest. In particular embodiments, networking system 1202 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1202 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1202 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1208 (e.g., via an API or other communication channel), or from another suitable system. In response to the request, networking system 1202 may calculate the coefficient (or access the coefficient information if it has previously been calculated and stored). In particular embodiments, networking system 1202 may measure an affinity with respect to a particular process. Different processes (both internal and external to the online social network) may request a coefficient for a particular object or set of objects. Networking system 1202 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/971,2027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1304 corresponding to a particular photo may have a privacy setting specifying that the photo may only be accessed by users tagged in the photo and their friends. In particular embodiments, privacy settings may allow users to opt in or opt out of having their actions logged by networking system 1202 or shared with other systems (e.g., third-party system 1208). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1208, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1202 may send a request to the data store for the object. The request may identify the user associated with the request and may only be sent to the user (or a client device 1206 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
conducting, by a client device, a video call with a participant device through a streaming channel established for the video call;
receiving a live video feed and video processing data from the participant device through the streaming channel established for the video call; and
rendering, within a digital video call interface displayed within the client device, the live video feed from the participant device as a video texture within an augmented reality effect based on the video processing data from the participant device,
wherein the augmented reality effect comprises an augmented reality element that interacts with one of a user of the participant device and an environment captured in the live video feed.

2. The computer-implemented method of claim 1, further comprising:
capturing additional video by the client device;
generating additional video processing data from the additional video; and
rendering, within the digital video call interface displayed within the client device, the additional video as an additional video texture within an additional augmented reality effect based on the additional video processing data.

3. The computer-implemented method of claim 2, further comprising displaying the video texture within the augmented reality effect and the additional video texture within the additional augmented reality effect within an augmented reality scene.

4. The computer-implemented method of claim 1, wherein receiving the video processing data comprises receiving at least one of face tracking data, segmentation data, alpha channel data, a face mask, and participant metadata corresponding to the video from the participant device.

5. The computer-implemented method of claim 1, further comprising receiving the live video feed and the video processing data through the streaming channel by receiving a split video frame comprising a digital video frame captured on the participant device within a first portion of the split video frame and the video processing data within a second portion of the split video frame.

6. The computer-implemented method of claim 1, further comprising receiving the live video feed and the video processing data through the streaming channel by:
receiving the live video feed through a video data channel established for the video call; and
receiving the video processing data through a video processing data channel established for the video call.

7. The computer-implemented method of claim 1, further comprising rendering, within the digital video call interface displayed within the client device, the video texture within the augmented reality effect to depict a participant captured in the live video feed from the participant device within an augmented reality scene as the augmented reality effect.

8. The computer-implemented method of claim 7, further comprising generating the video texture by utilizing the video processing data to fit the participant depicted within the live video feed from the participant device into the augmented reality effect.

9. The computer-implemented method of claim 1, further comprising:
receiving additional video and additional video processing data through the streaming channel from an additional participant device to establish the video call between the client device, the participant device, and the additional participant device; and
rendering, within the digital video call interface displayed within the client device, the additional video utilizing the additional video from the additional participant device as an additional video texture within an additional augmented reality effect based on the additional video processing data from the additional participant device.

10. The computer-implemented method of claim 1, further comprising:
identifying, utilizing the video processing data, a person depicted within the live video feed captured at the participant device,
wherein rendering the live video feed from the participant device as the video texture within the augmented reality effect comprises rendering video of the person as the video texture within the augmented reality effect.

11. The computer-implemented method of claim 10, further comprising:
identifying, utilizing the video processing data, an additional person depicted within the live video feed captured at the participant device; and
rendering, within the digital video call interface displayed within the client device, video of the additional person as an additional video texture within an additional augmented reality effect.

12. A non-transitory computer-readable medium storing instructions that, when executed by at least one processor, cause the at least one processor to:
conduct a video call with a participant device through a streaming channel established for the video call between the participant device and a client device;
receive video data and video processing data from the participant device through the streaming channel established for the video call with the participant device; and
receive, through the streaming channel, a coordination signal indicating that the participant device is ready to render augmented reality elements utilizing video textures of videos corresponding to the video call; and
render, within a digital video call interface, a video utilizing the video data from the participant device as a video texture within an augmented reality effect based on the video processing data from the participant device and further based on receiving the coordination signal.

13. The non-transitory computer-readable medium of claim 12, further comprising instructions that, when executed by the at least one processor, cause the at least one processor to:
capture additional video data;
generate additional video processing data from the additional video data; and render, within the digital video call interface, an additional video utilizing the additional video data as an additional video texture within an additional augmented reality effect based on the additional video processing data.

14. The non-transitory computer-readable medium of claim 13, further comprising instructions that, when executed by the at least one processor, cause the at least one processor to assign universal positions for the augmented reality effect and the additional augmented reality effect within an augmented reality scene, wherein the universal positions are shared between the client device and the participant device.

15. The non-transitory computer-readable medium of claim 12, further comprising instructions that, when executed by the at least one processor, cause the at least one processor to receive the video data and the video processing data through the streaming channel by receiving a split video frame comprising a digital video captured on the participant device within a first portion of the split video frame and the video processing data within a second portion of the split video frame through a video data channel.

16. A shared augmented reality scene video call system comprising:
   at least one server configured to establish a shared augmented reality scene video call between a first participant device and a second participant device by establishing a streaming channel between the first participant device and the second participant device, wherein:
   the second participant device receives, through the streaming channel, a coordination signal indicating that the first participant device is ready to render augmented reality elements utilizing video textures of videos corresponding to the video call; and
   the first participant device captures a first video stream and transmits the first video stream to the second participant device via the streaming channel;
   the second participant device captures a second video stream and transmits the second video stream to the first participant device via the streaming channel;
   the second participant device transmits video processing data of the second video stream to the first participant device via the streaming channel; and
   the first participant device renders, within a digital video call interface displayed within the first participant device, the second video stream from the second participant device as a video texture within an augmented reality effect in the shared augmented reality scene video call utilizing the video processing data of the second video stream and further based on receiving the coordination signal.

17. The shared augmented reality scene video call system of claim 16, wherein the first participant device renders, within the digital video call interface displayed within the first participant device, the first video stream captured on the first participant device as an additional video texture within an additional augmented reality effect in the shared augmented reality scene video call utilizing video processing data of the first video stream.

18. The shared augmented reality scene video call system of claim 16, wherein:
   the first participant device transmits video processing data of the first video stream to the second participant device via the streaming channel; and
   the second participant device renders, within an additional digital video call interface displayed within the second participant device, the first video stream from the first participant device as an additional video texture within an additional augmented reality effect in the shared augmented reality scene video call utilizing the video processing data of the first video stream.

19. The shared augmented reality scene video call system of claim 16, wherein:
   the second participant device transmits the second video stream and the video processing data of the second video stream to the first participant device via the streaming channel by utilizing a split video frame comprising a video frame and the video processing data; or
   the second participant device transmits the second video stream and the video processing data of the second video stream to the first participant device by:
   transmitting the second video stream to the first participant device via a video data channel; and
   transmitting the video processing data of the second video stream to the first participant device via a video processing data channel.

* * * * *